United States Patent
Iwata et al.

(10) Patent No.: US 12,344,475 B2
(45) Date of Patent: Jul. 1, 2025

(54) TRANSPORT APPARATUS

(71) Applicant: Daifuku Co., Ltd., Osaka (JP)

(72) Inventors: Masashige Iwata, Hinocho (JP);
Kazunari Kimura, Hinocho (JP);
Hiroyoshi Murata, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 615 days.

(21) Appl. No.: 17/834,526

(22) Filed: Jun. 7, 2022

(65) Prior Publication Data

US 2022/0388778 A1     Dec. 8, 2022

(51) Int. Cl.
*G06F 7/00*     (2006.01)
*B65G 1/137*     (2006.01)

(52) U.S. Cl.
CPC .................. *B65G 1/1375* (2013.01)

(58) Field of Classification Search
CPC ............................... B65G 1/1375; B65G 1/04
USPC ........................................ 700/213–214, 218
See application file for complete search history.

(56) References Cited

U.S. PATENT DOCUMENTS

2022/0135323 A1    5/2022   Kimura
2022/0379793 A1*   12/2022   Hopkins ................ B60J 5/0497

FOREIGN PATENT DOCUMENTS

CN         212198338 U   * 12/2020
JP          2020152566 A     9/2020

* cited by examiner

*Primary Examiner* — Yolanda R Cumbess
(74) *Attorney, Agent, or Firm* — The Webb Law Firm

(57) ABSTRACT

A turning device includes a rattling restriction mechanism configured to restrict a rattling in a turning direction of a turner caused by backlashes in a transmission mechanism. The rattling restriction mechanism includes a pushed portion and a restriction section. The pushed portion includes a pushed face facing the turning direction. The restriction section includes: a contact member configured to come into contact with the pushed face while the pushed face is positioned in a specific range in the turning direction, the contact member is arranged in a movement path of the pushed face configured to move in conjunction with a turning of the turner; and a biasing mechanism configured to bias the contact member in contact with the pushed face, toward the pushed face in the turning direction.

6 Claims, 11 Drawing Sheets

Fig.6
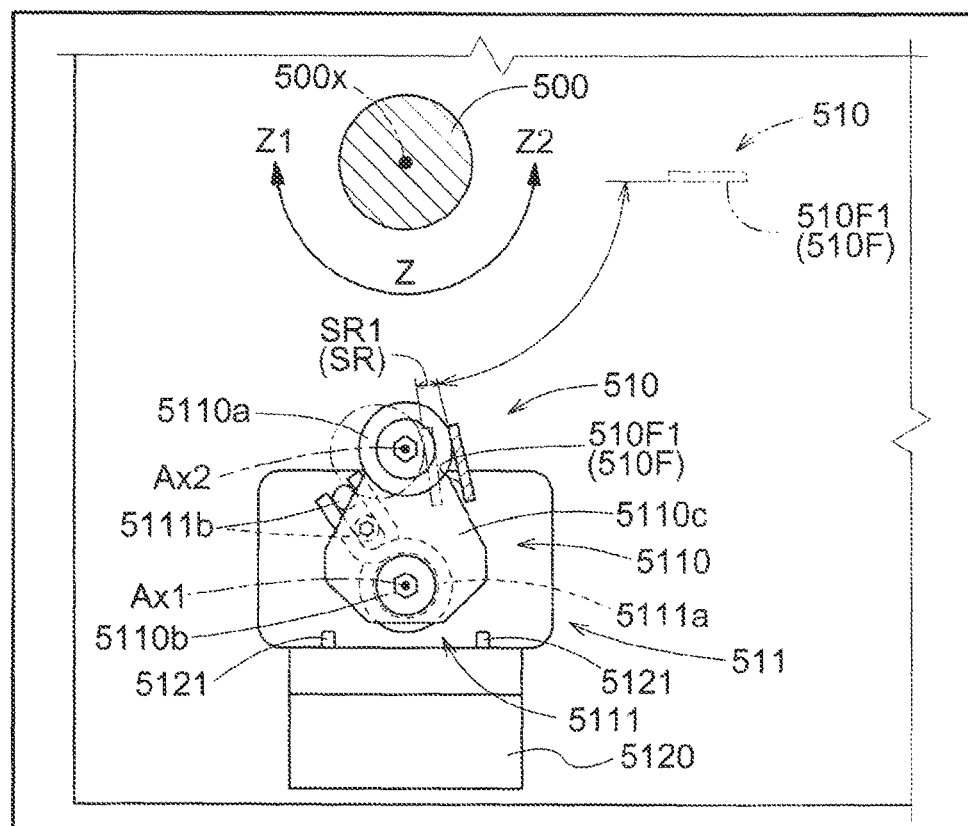
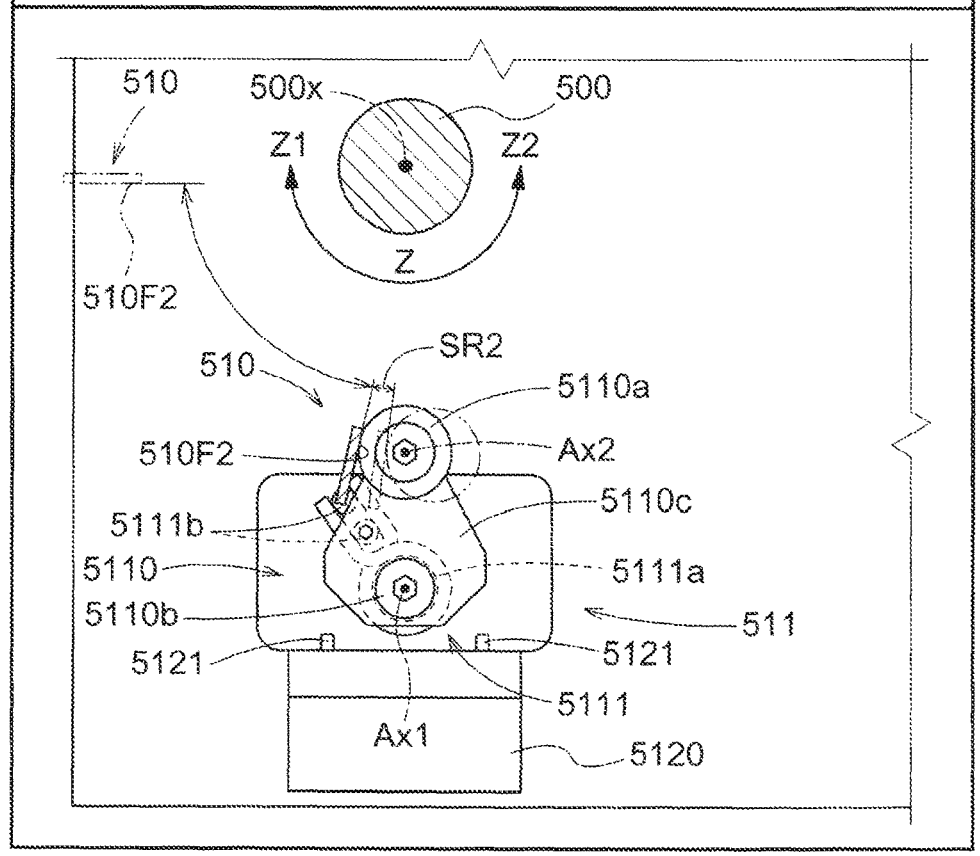

TRANSPORT APPARATUS

CROSS-REFERENCE TO RELATED APPLICATION

This application claims priority to Japanese Patent Application No. 2021-095960 filed Jun. 8, 2021, the disclosure of which is hereby incorporated by reference in its entirety.

BACKGROUND OF THE INVENTION

1. Field of the Invention

The present invention relates to a transport apparatus that transports articles.

2. Description of the Related Art

JP 2020-152566A (Patent Document 1) discloses an example of this kind of transport apparatus. In the following, the reference numerals in parentheses in the description of the background section are those used in Patent Document 1.

The transport apparatus disclosed in Patent Document 1 has a transfer machine (24) for transferring an article (W), and a turning device (26) for turning the transfer machine (24). The transfer machine (24) transfers the article (W) to and from a transfer target location, which is arranged away in the horizontal direction from the transfer machine (24), by moving back and forth in the horizontal direction. The turning device (26) changes the direction in which the transfer machine (24) moves back and forth, i.e., the direction in which the transfer machine (24) transfers the article (W), by turning the transfer machine (24) about a turning axis parallel to the vertical direction.

In the technique of Patent Document 1, transfer target locations are set in different directions about the turning axis of the transfer machine (24). For example, if the transport apparatus is present between two storage racks (1) facing each other, each of the two storage racks (1) located on both sides of the transport apparatus can be a transfer target location. In this case, the transport apparatus changes the direction in which the transfer machine (24) transfers the article (W) in accordance with the transfer target location by turning the transfer machine (24) with use of the turning device (26).

SUMMARY OF THE INVENTION

Here, turning devices such as the above often have a transmission mechanism for transmitting a turning driving force from a drive source with use of gears, chains, toothed belts, toothed pulleys, or the like. However, gaps, namely backlashes are commonly provided at meshing portions in the transmission mechanism, such as meshing portions between gears, meshing portions between a chain and sprockets, or meshing portions between a toothed belt and toothed pulleys. For this reason, the transfer machine rattles in the turning direction due to the backlashes, in a configuration in which the transfer machine is turned with use of a turning device such as the above. If the transfer machine thus rattles significantly, the orientation of the transfer machine in the turning direction becomes unstable, and the transfer machine may not be able to appropriately transfer the article.

In view of the foregoing situation, it is desirable to realize a technique capable of reducing rattling in the turning direction of the transfer machine due to backlashes in a transport apparatus that has the turning device capable of changing the transfer direction of the article.

A technique for solving the foregoing problem is as follows.

A transport apparatus that transports an article, the apparatus including:
  a holder configured to hold the article;
  a transfer machine configured to move the article in a transfer direction and transfer the article between the holder and a transfer target location;
  a support body supporting the holder and the transfer machine; and
  a turning device configured to change the transfer direction by turning the holder and the transfer machine relative to the support body about a turning axis orthogonal to the transfer direction,
  the turning device including:
    a turner configured to turn relative to the support body about the turning axis, the turner supporting the holder and the transfer machine;
    a turner drive source configured to drive the turner to turn;
    a transmission mechanism configured to transmit a turning driving force from the turner drive source to the turner; and
    a rattling restriction mechanism configured to restrict rattling in a turning direction of the turner caused by a backlash in the transmission mechanism,
  the rattling restriction mechanism including:
    a pushed portion configured to rotate in conjunction with turning of the turner; and
    a restriction section supported by the support body,
  the pushed portion including a pushed face facing the turning direction, and
  the restriction section including:
    a contact member configured to come into contact with the pushed face while the pushed face is positioned in a specific range in the turning direction, the contact member being arranged in a movement path of the pushed face configured to move in conjunction with the turning of the turner; and
    a biasing mechanism configured to bias the contact member that is in contact with the pushed face, toward the pushed face in the turning direction.

According to this configuration, the contact member comes into contact with the pushed face while the pushed face is positioned in the specific range in the turning direction. The biasing mechanism biases the contact member in contact with the pushed face, toward the pushed face in the turning direction. It is thus possible to exert, on the transmission mechanism, a force that causes members meshing with each other at meshing portions in the transmission mechanism to push each other, and to reduce the backlashes in the transmission mechanism. Accordingly, rattling in the turning direction of the turner and the transfer machine supported by the turner can be reduced. For the above reason, this configuration reduces rattling in the turning direction of the transfer machine caused by the backlashes.

Further features and advantages of the technique according to the present disclosure will become more apparent in the description of the following exemplary and non-limiting embodiment that will be described with reference to the drawings.

BRIEF DESCRIPTION OF THE DRAWINGS

FIG. 6 illustrates specific ranges.

DETAILED DESCRIPTION OF PREFERRED EMBODIMENTS

A transport apparatus is an apparatus that transports articles. The following is a description of an embodiment of a transport apparatus with reference to an example where the transport apparatus is provided in a transport facility in which containers are transport. That is, in the following embodiment, a container corresponds to an "article", and the transport apparatus is configured to transport containers.

Figure 1:
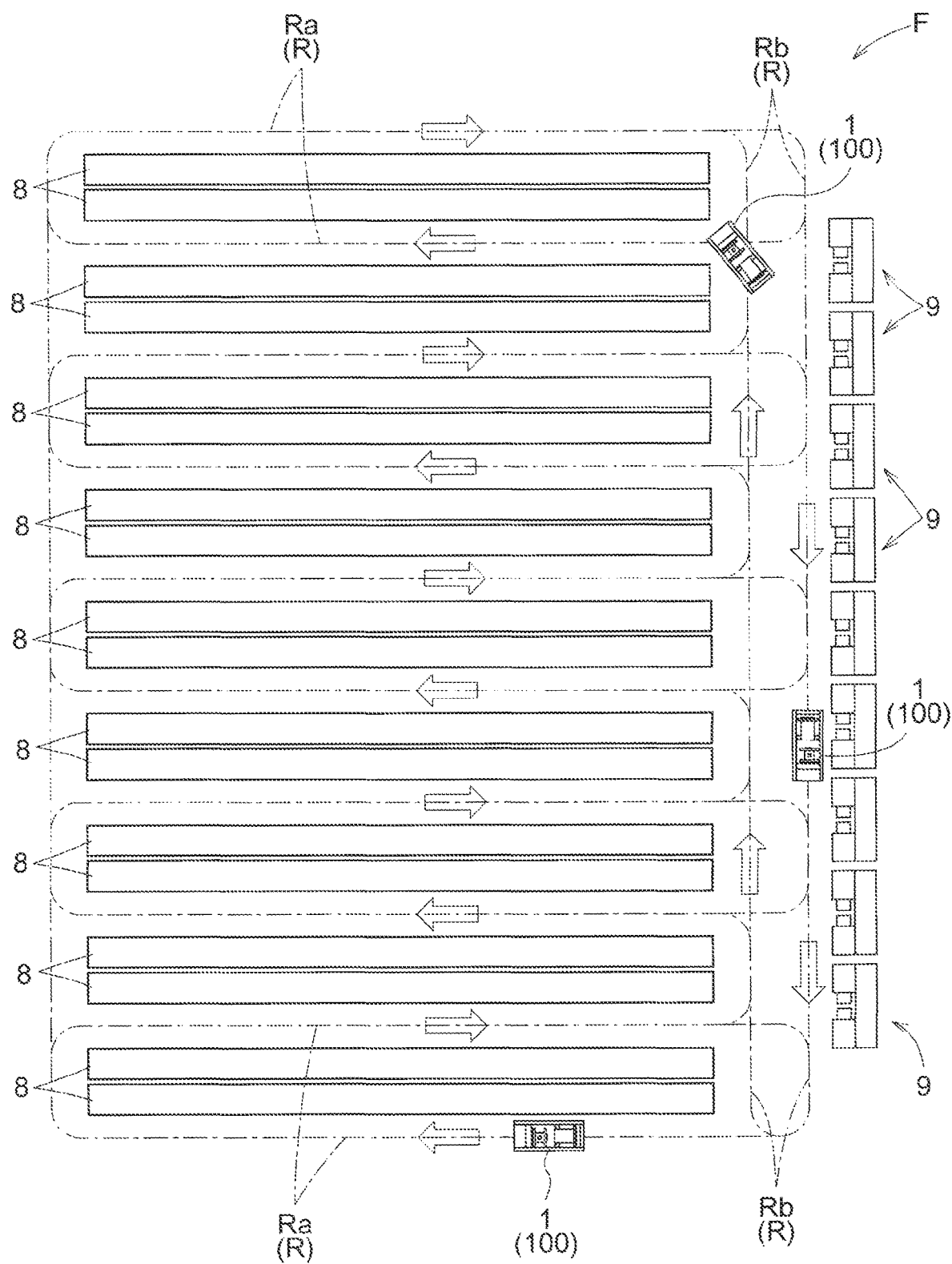
FIG. 1 is a plan view of a transport facility.

A transport facility F includes container racks 8 for storing containers 70 (see FIG. 2), and loading/unloading sections 9 for loading containers 70 into the transport facility F and unloading the containers 70 from the transport facility F, as shown in FIG. 1. Transport apparatuses 100 transport the containers 70 loaded through the loading/unloading sections 9 to the container racks 8, or transport the containers 70 stored in the container racks 8 to the loading/unloading sections 9 for unloading.

In the present embodiment, a plurality of container racks 8 are arranged parallel to each other with regular spacings. Each of the container racks 8 is open at least in a front face thereof. The containers 70 are delivered and picked up in this front face. Parts of a travel path R for traveling bodies 1 (transport apparatuses 100) are set between adjacent pairs of container racks 8 whose front faces oppose each other. In other words, two adjacent container racks 8 are arranged parallel to each other with a spacing, and a part of the travel path R is set to pass between the two container racks 8. Container racks 8 arranged at the ends, of the plurality of container racks 8 provided in the transport facility F, are arranged with their front faces facing the outer side. Parts of the travel path R are also set in regions extending along the front faces of these container racks 8 at the ends. The transport facility F also includes a plurality of loading/unloading sections 9. Parts of the travel path R are also set in regions passing by the plurality of loading/unloading sections 9.

The travel path R includes paths Ra in a rack area, namely paths extending along the front faces of the container racks 8 in the extension direction of these container racks 8, and paths Rb outside the rack area, namely paths that are set outside the region where the container racks 8 are arranged. The paths Ra in the rack area are set in correspondence with the respective container racks 8. In the present embodiment, the paths Ra in the rack area correspond to parts of the travel path R that are set in regions between adjacent pairs of the container racks 8 with the front faces thereof opposing each other, and parts of the travel path R that are set in regions extending along the front faces of the container racks 8 arranged with the front faces thereof facing outward. The paths Rb outside the rack area are set to connect the plurality of paths Ra in the rack area. The paths Rb outside the rack area are also set to pass the plurality of loading/unloading sections 9. In the present embodiment, the paths Rb outside the rack area correspond to parts of the travel path R other than the paths Ra in the rack area.

Container Rack

Figure 2:
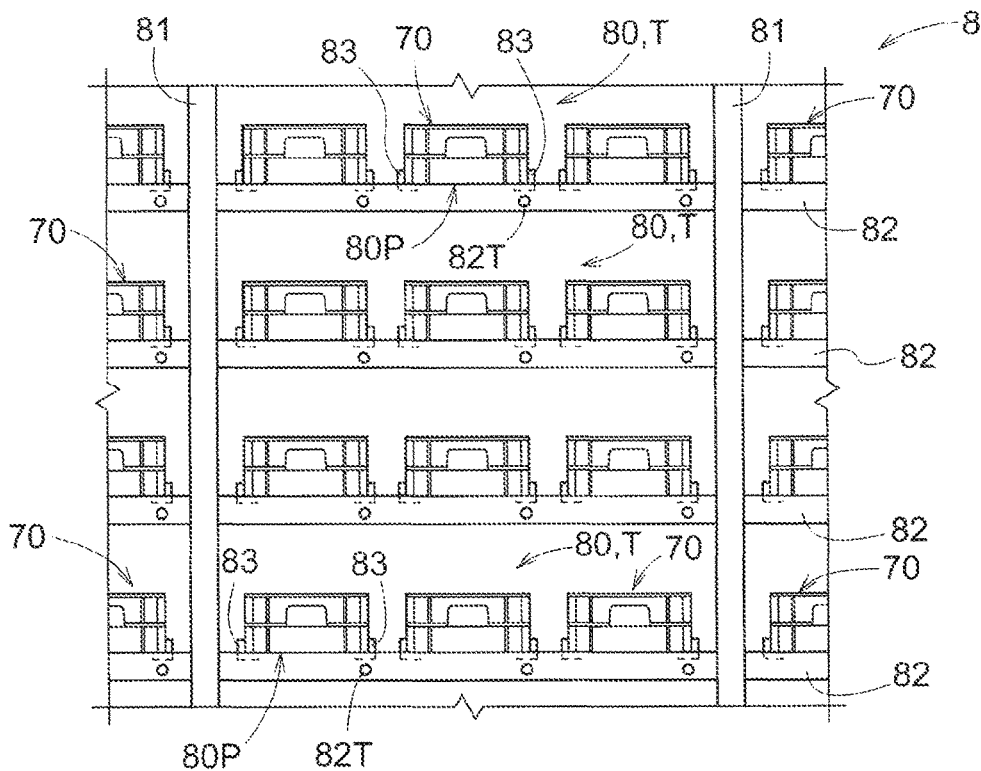
FIG. 2 is a front view of a container shelf.

Each container rack 8 includes a plurality of shelf sections 80 for storing containers 70, the shelf sections 80 being arranged along the vertical direction, as shown in FIG. 2. Each container rack 8 in the present embodiment includes a plurality of beam members 82 extending in the horizontal direction along the front face of the container rack 8, and a plurality of column members 81 extending in the vertical direction and joined to the plurality of beam members 82. That is, each container rack 8 has a support frame that is a combination of the plurality of column members 81 and the plurality of beam members 82.

The plurality of beam members 82 are spaced apart from each other in the vertical direction. Placement members 83 for placing containers 70 are attached to each of the beam members 82. In this example, a container 70 is stored in a shelf section 80 by being placed on a pair of placement members 83. A plurality of pairs of placement members 83 are arranged on each shelf section 80 such that a single shelf section 80 can store a plurality of containers 70. Note that in this example, the opening of each container rack 8 corresponds to a region between two column members 81 adjacent in the width direction (left-right direction) as viewed from the front in FIG. 2 and between two beam members 82 adjacent in the vertical direction.

Each shelf section 80 in the present embodiment has target points 82T, each of which serves as a target for storing a container 70 at a reference position 80P for storing a container 70. In this example, the target portions 82T are provided on the beam members 82. One target portion 82T is provided for one pair of placement members 83. In the example shown in FIG. 2, the target points 82T are holes formed in the beam members 82.

Container

The containers 70 are objects to be transported by the transport apparatuses 100. Although not specifically shown, each container 70 has a box shape with an opening portion that is open upward. In this example, the outer shape of the container as viewed in the vertical direction is a rectangular shape. The container 70 can accommodate a prescribed object to be accommodated. The object to be accommodated may be, for example, any of various products such as foodstuffs and household goods, or parts and work-in-progress used in factory production lines or the like.

Each container 70 in the present embodiment can be stacked with another container 70 with an object to be accommodated therein. That is, the containers 70 are stackable in the vertical direction (see FIG. 3). In this example, two containers 70 are stacked in the vertical direction as a result of a bottom portion of one container 70 being fitted from above to the opening portion of the other container 70.

Transport Apparatus

Figure 3:
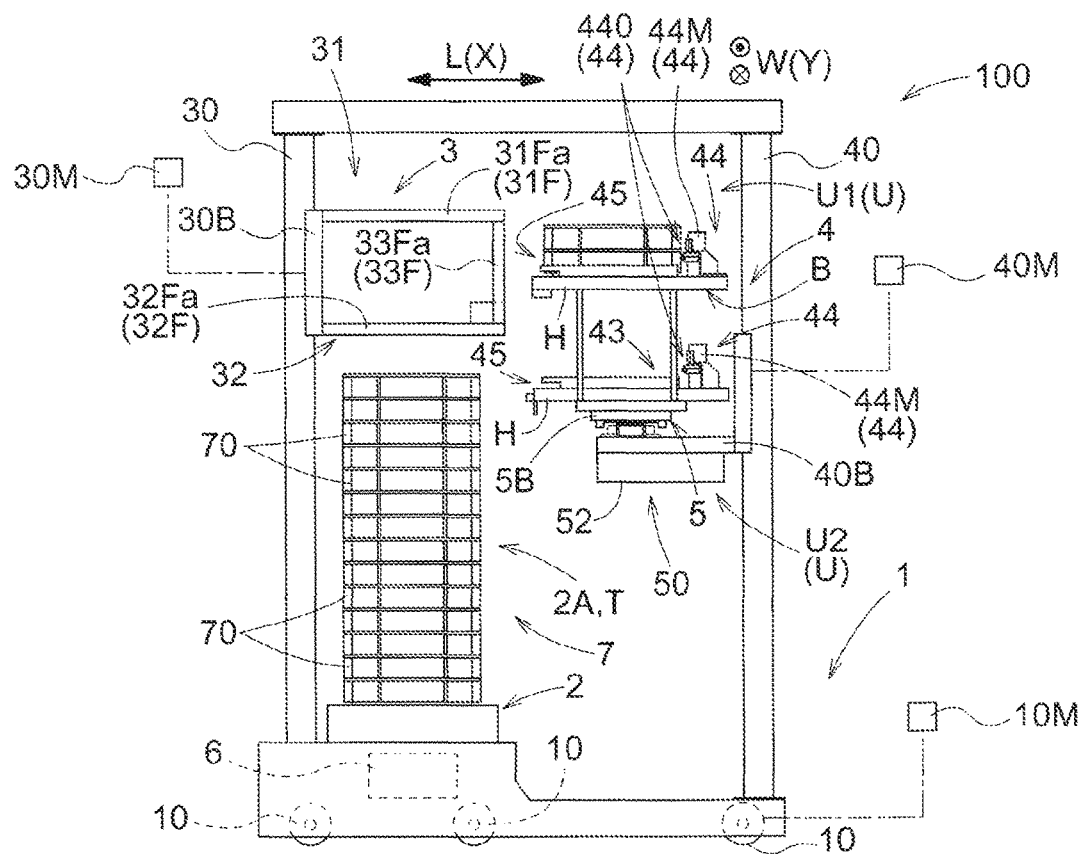
FIG. 3 shows the transport apparatus as viewed from a width direction of a vehicle body.

Each transport apparatus 100 has holders H for holding containers 70, transfer machines 44 for transferring containers 70 between the holders H and the transfer target location T, a transfer elevator 40B for supporting the holders H and the transfer machines 44, and a turning device 5 for turning the holders H and the transfer machines 44 relative to the transfer elevator 40B, as shown in FIG. 3. In the present embodiment, the transfer elevator 40B corresponds to a "support body".

Each transport apparatus 100 also has a traveling body 1 that travels along a predetermined travel path R (see FIG. 1), a transfer device 4 for transferring containers 70, a container group supporter 2 for supporting a container group 7, which includes a plurality of stacked containers 70, within a predetermined stacking region 2A, a lift device 3 for lifting containers 70 of the container group 7 supported by the container group supporter 2, and a controller 6 for controlling the traveling body 1, the transfer device 4, the container group supporter 2, and the lift device 3. Note that in the present embodiment, the aforementioned holders H, transfer machines 44, and transfer elevator 40B are each configured as a part of the transfer device 4. In other words, the transfer device 4 includes the holders H, the transfer machines 44, and the transfer elevator 40B.

The container group supporter 2, the lift device 3, and the transfer device 4 are mounted on the traveling body 1. When the direction in which the traveling body 1 travels is referred to as a "front-back direction L of the vehicle body", the container group supporter 2 and the transfer device 4 are arranged in the front-back direction L of the vehicle body on the traveling body 1. Note that a direction orthogonal to the front-back direction L of the vehicle body as viewed in the vertical direction is referred to as a "width direction W of the vehicle body" below.

The controller 6 controls functional units of the transport apparatus 100. The controller 6 in this example controls the traveling body 1, the container group supporter 2, the lift device 3, the transfer device 4, and the later-described turning device 5. Operations for transporting and transferring the containers 70 are realized by the controller 6 controlling the functional units. The controller 6 includes a processor such as a microcomputer, peripheral circuits such as a memory, and the like. Each function is realized by cooperation of these pieces of hardware and programs executed on the processors such as a computer.

Traveling Body

The traveling body 1 travels through the predetermined travel path R (see FIG. 1). The traveling body 1 in the present embodiment travels through the paths Ra in the rack area and the paths Rb outside the rack area. The traveling body 1 travels along the container racks 8 while traveling through the paths Ra in the rack area; more specifically, the traveling body 1 travels along the front faces of the container racks 8. The traveling body 1 in the present embodiment travels on a floor surface.

The traveling body 1 has a plurality of traveling wheels 10, and a travel drive unit 10M for driving at least one of the traveling wheels 10. The travel drive unit 10M includes a motor, which is not shown in the figures. The travel drive unit 10M applies a driving force in the traveling direction to the traveling body 1 by driving the traveling wheel(s) 10.

Container Group Supporter

The container group supporter 2 is mounted on the traveling body 1. The container group supporter 2 can support a container group 7, which includes a plurality of stacked containers 70. A stacking region 2A, in which the container group 7 is arrangeable, is defined above the container group supporter 2. The stacking region 2A is a three-dimensional virtual region extending upward from the container group supporter 2. The container group supporter 2 in this example is configured as a conveyor capable of moving the container group 7 placed thereon. The container group supporter 2 in this example can move the container group 7 in the width direction W of the vehicle body. The conveyor constituting the container group supporter 2 may be, for example, any known conveyor such as a roller conveyor, a chain conveyor, or a belt conveyor.

A container group 7, which includes a plurality of stacked containers 70, is loaded to one of the loading/unloading section 9 (see FIG. 1). The container group supporter 2 receives the container group 7 from the loading/unloading section 9, or delivers the container group 7 to the loading/unloading section 9 while the traveling body 1 is next to the loading/unloading section 9. That is, the container group supporter 2 receives the container group 7 from, and delivers the container group 7 to, the loading/unloading section 9. Although not specifically shown, the loading/unloading section 9 in this example is adjacent to a picking area where the work of taking accommodated objects out of the containers 70 is performed. After the container group 7 has been delivered from the container group supporter 2 to the loading/unloading section 9, the accommodated objects are taken out of the containers 70 in the picking area adjacent to the loading/unloading section 9. After some or all of the objects accommodated in the containers 70 have been taken out, these containers 70 are delivered from the loading/unloading section 9 to the container group supporter 2 (transport apparatus 100) and transported to a container rack 8 again. However, the loading/unloading section 9 need not be adjacent to the picking area, and may alternatively be adjacent to any other facility or work area. For example, each loading/unloading section 9 may transport the container group 7 delivered from the container group supporter 2 to outside the transport facility F.

Lift Device

The lifting device 3 is mounted on the traveling body 1. The lift device 3 lifts the containers 70 of the container group 7 supported by the container group supporter 2, i.e., the containers 70 of the container group 7 arranged in the stacking region 2A.

The lift device 3 has a lifting mast 30, which stands upward on the traveling body 1, a lifting elevator 30B joined to the lifting mast 30, and a lifting elevator drive unit 30M for raising and lowering the lifting elevator 30B along the lifting mast 30. Although not specifically shown, the lifting elevator drive unit 30M has an endless body such as a belt that is joined to the lifting elevator 30B, a rotating body around which the endless body is wound, and a motor for driving the rotating body to rotate, for example.

Figure 13:
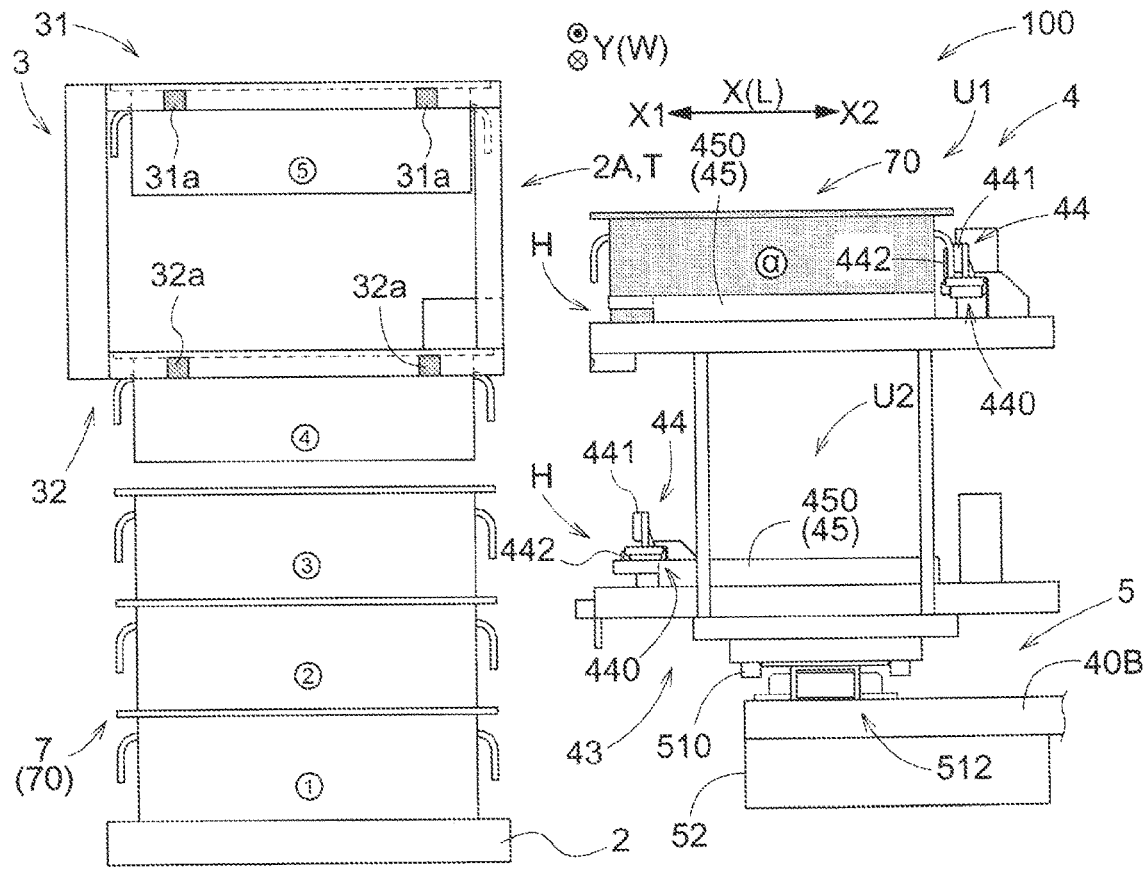
FIG. 13 illustrates parallel operations to pick up and deliver containers from and to a stacking region.

The lift device 3 has a first lift mechanism 31 for lifting a container 70 at a specific height in the stacked container group 7 in the stacking region 2A relative to a container 70 immediately below the container 70 to be lifted, and a second lift mechanism 32 for lifting a container 70 located below the container 70 lifted by the first lift mechanism 31 relative to a container 70 immediately below the container 70 to be lifted by the second lift mechanism 32. The first lift mechanism 31 and the second lift mechanism 32 in the present embodiment are spaced apart in the vertical direction. This configuration enables a space to be formed in the vertical direction between a container 70 lifted by the first lift mechanism 31 and a container 70 lifted by the second lift mechanism 32 as shown in FIG. 13, for example. A space can also be formed in the vertical direction below the container 70 lifted by the second lift mechanism 32.

The lift device 3 in the present embodiment has a first frame portion 31F and a second frame portion 32F that protrude in the front-back direction L of the vehicle body from the lifting elevator 30B toward the stacking region 2A, and a joint frame portion 33F that joins the first frame portion 31F to the second frame portion 32F. The first frame portion 31F and the second frame portion 32F are spaced apart in the vertical direction. The first frame portion 31F is arranged above the second frame portion 32F. The joint frame portion 33F joins the first frame portion 31F to the second frame portion 32F in the vertical direction. This configuration does not allow the first frame portion 31F and the second frame portion 32F to move relatively. The spacing in the vertical direction between the first frame portion 31F and the second frame portion 32F is always fixed. The first frame portion 31F, the second frame portion 32F, and the joint frame portion 33F integrally rises and lowers with the lifting elevator 30B rising and lowering.

Although not specifically shown, the first frame portion 31F in the present embodiment has two first frame members 31Fa spaced apart in the width direction W of the vehicle body. The two first frame members 31Fa are arranged in correspondence with the width (length in the width direction W of the vehicle body) of the containers 70 arranged in the stacking region 2A. The second frame portion 32F has two second frame members 32Fa spaced apart in the width direction W of the vehicle body. The two second frame members 32Fa are arranged in correspondence with the width of the containers 70 arranged in the stacking region 2A. The joint frame portion 33F has a joint frame member 33Fa. The joint frame member 33Fa joins the first frame member 31Fa and the second frame member 32Fa, which are arranged in the vertical direction, to each other.

The first lift mechanism 31 in the present embodiment has first lift holders 31a for holding a container 70, and a first lift drive unit (not shown) for changing the orientation of the first lift holders 31a, as shown in FIG. 13. Although not specifically shown, the first lift drive unit changes the orientation of the first lift holders 31a between a holding orientation in which the first lift holders 31a hold a container 70, and a non-holding orientation in which the first lift holders 31a do not hold a container 70. FIG. 13 shows the first lift holders 31a in the holding orientation.

Similarly, the second lift mechanism 32 has second lift holders 32a for holding a container 70, and a second lift drive unit (not shown) for changing the orientation of the second lift holders 32a. Although not specifically shown, the second lift drive unit changes the orientation of the second lift holders 32a between a holding orientation in which the second lift holders 32a hold a container 70, and a non-holding orientation in which the second lift holders 32a do not hold a container 70. FIG. 13 shows the second lift holders 32a in the holding orientation.

In FIG. 13, the containers 70 stacked in the stacking region 2A are assigned numerals "1 to 5" in the ascending order from the bottom to the top. A container 70 held by the transfer device 4 is assigned letter "a".

Figure 14:
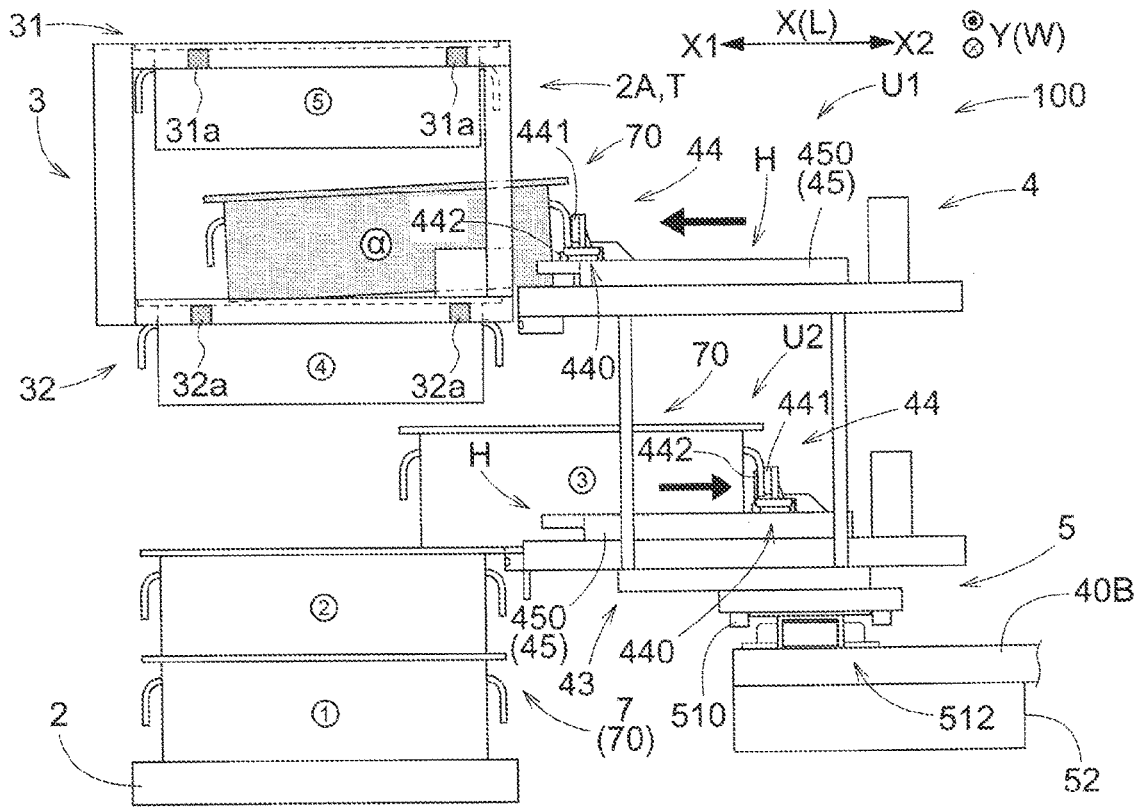
FIG. 14 illustrates parallel operations to pick up and deliver containers from and to the stacking region.

If a space is formed in the vertical direction between the container 70 lifted by the first lift mechanism 31 and the container 70 lifted by the second lift mechanism 32, another container 70 can be delivered into this space. That is, the transfer device 4 can stack another container 70 on the container 70 lifted by the second lift mechanism 32. FIG. 14 shows an example where a container 70 (container "a") held by the transfer device 4 is delivered into the space formed in the vertical direction between the container 70 (container "5") lifted by the first lift mechanism 31 and the container 70 (container "4") lifted by the second lift mechanism 32.

If a space is formed in the vertical direction below the container 70 lifted by the second lift mechanism 32, a container 70 arranged below the container 70 lifted by the second lift mechanism 32 can be picked up with use of this space. FIG. 14 shows an example of picking up a container 70 (container "3") arranged below the container 70 (container "4") lifted by the second lift mechanism 32. Note that the operation to deliver a container 70 to the stacking region 2A and the operation to pick up a container 70 from the stacking region 2A will be described later.

Transfer Device

The transfer device 4 is mounted on the traveling body 1 and transfers containers 70, as shown in FIG. 3. The transfer device 4 has the holders H for holding containers 70, the transfer machines 44 for performing a delivery operation, i.e., an operation to deliver a container 70 from a holder H to the transfer target location T and a pick-up operation, i.e., an operation to pick up a container 70 from the transfer target location T to a holder H, and guide mechanisms 45 for guiding the containers 70 that move between the holders H and the transfer target location T. The transfer device 4 also has a transfer mast 40 fixed to the traveling body 1 and arranged along the vertical direction, a transfer elevator 40B that ascends and descends along the transfer mast 40, and a transfer elevator drive unit 40M for raising and lowering the transfer elevator 40B along the transfer mast 40. The transfer elevator 40B supports the holders H, the transfer machines 44, and the guide mechanisms 45. Although not specifically shown, the transfer elevator drive unit 40M includes, for example, an endless body such as a belt joined to the transfer elevator 40B, a rotating body around which the endless body is wound, and a motor for driving the rotating body to rotate. Note that the transfer target location T in the present embodiment includes the stacking region 2A and a shelf section 80 of a container rack 8.

Here, the movement direction of the containers 70 transferred by the transfer device 4 is referred to as a "transfer direction X", and a direction orthogonal to the transfer direction X as viewed in the vertical direction is referred to as a "width direction Y". The transfer target location T side relative to the holders H in the transfer direction X is referred to as a "delivery side X1 in the transfer direction", and the holder H side relative to the transfer target location T in the transfer direction X is referred to as a "pick-up side X2 in the transfer direction". The transfer direction X is a direction parallel to the horizontal direction. In this example, the width direction Y is also a direction parallel to the horizontal direction. The delivery side X1 in the transfer direction is the side toward which a container 70 moves in the transfer direction X when this container 70 is delivered. The pick-up side X2 in the transfer direction is the side toward which a container 70 moves in the transfer direction X when this container 70 is picked up.

Each transfer machine 44 moves a container 70 in the transfer direction X and transfers the container 70 between the corresponding holder H and the transfer target location T. Each transfer machine 44 in the present embodiment performs the operation to deliver a container 70 by moving the container 70 from the holder H toward the delivery side X1 in the transfer direction. Also, each transfer machine 44 performs the operation to pick up a container 70 by moving the container 70 from the transfer target location T toward the pick-up side X2 in the transfer direction.

Each transfer machine 44 in the present embodiment has a contact portion 440 that comes into contact with a container 70 and moves the container 70 in the transfer direction X during the transfer operation, and a transfer drive unit 44M for causing the contact portion 440 to reciprocate in the transfer direction X. The transfer drive unit 44M includes a mechanism (not shown) for causing the contact portion 440 to reciprocate in the transfer direction X, and a motor for driving this mechanism.

Figure 10:
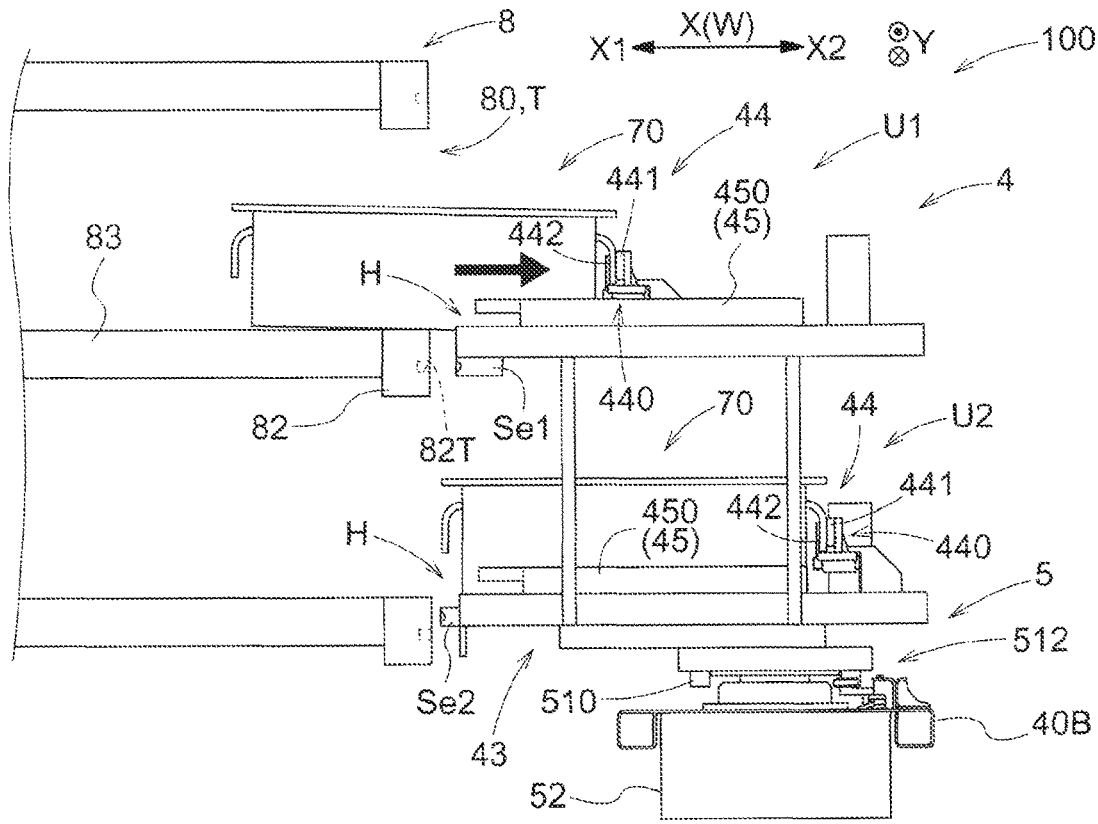
FIG. 10 illustrates an operation to pick up a container from a shelf section.

The contact portion 440 in the present embodiment includes a pusher 441 for pushing a container 70 toward the delivery side X1 in the transfer direction while the operation to deliver the container 70 is being performed (see FIG. 12), and a lockable portion 442 that is locked to a container 70 and pulls the container 70 toward the pick-up side X2 in the transfer direction while the operation to pick up the container 70 is being performed (see FIG. 10). Note that the lockable portion 442 changes in orientation between a locking orientation in which the lockable portion 442 is locked to a container 70, and a non-locking orientation in which the lockable portion 442 is not locked to a container 70. The lockable portion 442 changes in orientation between the locking orientation and the non-locking orientation depending on the situation.

Figure 12:
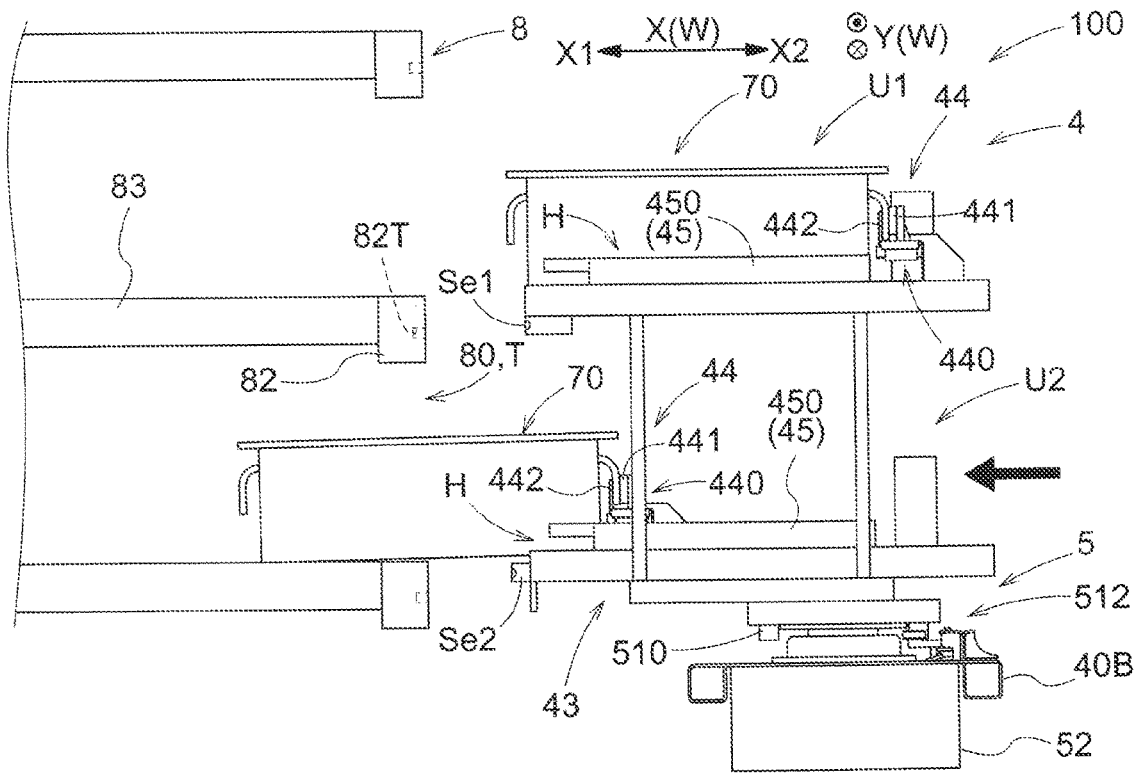
FIG. 12 illustrates an operation to deliver a container to a shelf section.

For example, the pusher 441 pushes a container 70 to be delivered toward the delivery side X1 in the transfer direction by relatively moving toward the delivery side X1 in the transfer direction relative to the holder H, as shown in FIG. 12. Also, for example, the lockable portion 442 pulls a container 70 to be picked up toward the pick-up side X2 in the transfer direction by relatively moving toward the pick-up side X2 in the transfer direction with respect to the holder H, as shown in FIG. 10. In the following, the pusher 441 and the lockable portion 442 are collectively referred to as the "contact portion 440" in some cases.

Figure 11:
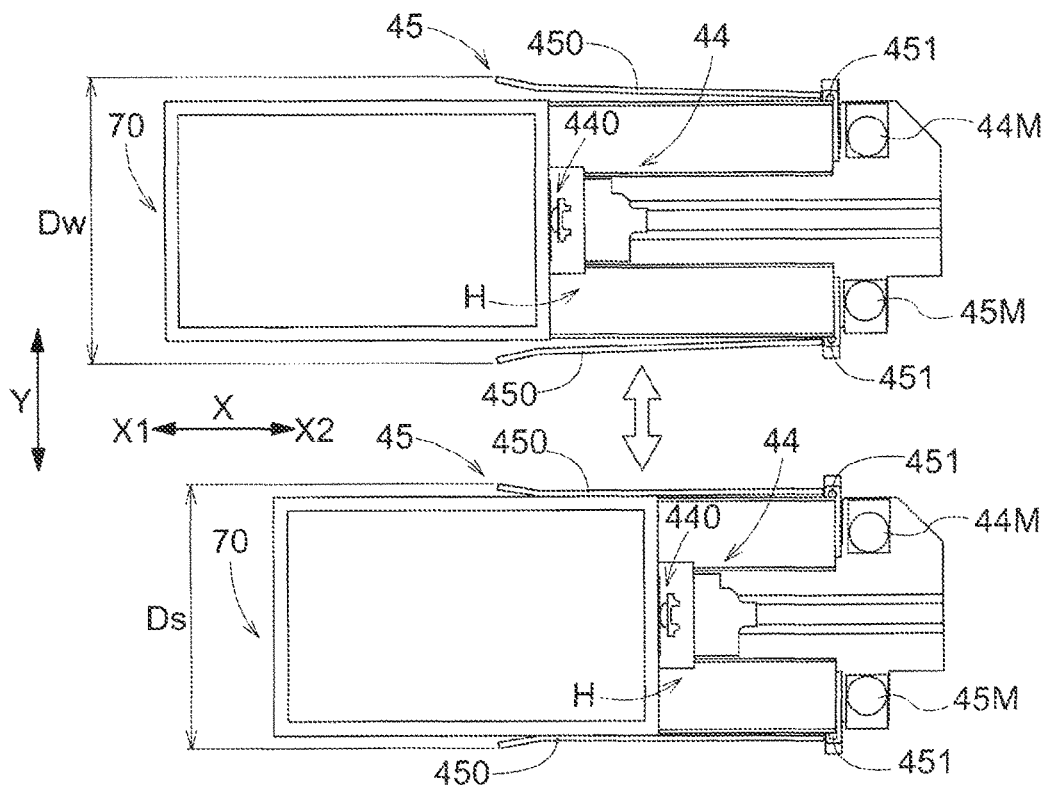
FIG. 11 illustrates an operation to pick up a container from a shelf section.

Each guide mechanism 45 guides in the transfer direction X a container 70 moving between the corresponding holder H and the transfer target location T. Each guide mechanism 45 in the present embodiment includes two guides 450 arranged on respective sides, in the width direction Y, of a container 70 held by the holder H, and a guide drive unit 45M for changing the spacing in the width direction Y between the two guides 450, as shown in FIG. 11. The guide drive unit 45M includes a mechanism (not shown) for changing the spacing in the width direction Y between the two guides 450, and a motor for driving this mechanism.

Each of the two guides 450 in the present embodiment extends in the horizontal direction, and is supported turnably about an axis parallel to the vertical direction, by the holder H. Each of the two guides 450 in this example has a support portion 451 serving as the turning center, and turns about the support portion 451 as a whole.

The guide drive unit 45M changes the spacing in the width direction Y between the two guides 450, as mentioned above. Precisely, in this example, the spacing in the width direction Y between the two guides 450 does not change at the support portions 451 serving as the turning center of the respective guides 450, but changes in portions on the outer side of the support portions 451 in the radial direction (radial direction based on the turning center). Here, however, the spacing in the width direction Y between the two guides 450 is regarded as changing if the spacing in the width direction Y between the two guides 450 changes in the portions of the guides 450 on the outer side of the support portions 451 in the radial direction.

The guide drive unit 45M in the present embodiment changes the spacing in the width direction Y between the two guides 450 between a reference spacing Ds, which is a spacing when the two guides 450 are arranged along the transfer direction X, and a wide spacing Dw, which is a spacing wider than the reference spacing Ds, as shown in FIG. 11. The guide drive unit 45M in this example changes, between the reference spacing Ds and the wide spacing Dw, the spacing in the width direction Y between the two guides 450 by synchronously turning the two guides 450.

The transfer device 4 in the present embodiment includes a plurality of (two in this example) units U each of which includes the above-described transfer machine 44, guide mechanism 45, and holder H, as shown in FIG. 3. These units U include a first unit U1 and a second unit U2 arranged below the first unit U1. The first unit U1 and the second unit U2 are supported by the transfer elevator 40B, and have the same structure. In the following, the first unit U1 and the second unit U2 are collectively referred to as a "unit U" in some cases.

The transfer device 4 in the present embodiment has a holder joint 43 for joining the first unit U1 to the second unit U2 in the vertical direction. The holder joint 43 joins the first unit U1 to the second unit U2 such that the spacing therebetween in the vertical direction is fixed. The holder joint 43 in the shown example joins the holder H of the first unit U1 to the holder H of the second unit U2. The transfer device 4 in the present embodiment thus includes the plurality of units U arranged in the vertical direction.

Turning Device

The turning device 5 is mounted on the traveling body 1, as shown in FIG. 3. The turning device 5 changes the transfer direction X by turning the holders H and the transfer machines 44 relative to the transfer elevator 40B about a turning axis 500x (see FIG. 4) that is orthogonal to the transfer direction X. The turning device 5 also turns the guide mechanisms 45 in addition to the holders H and the transfer machines 44. The turning device 5 in the present embodiment integrally turns more than one units U (here, the first unit U1 and the second unit U2) each of which includes the holder H, the transfer machine 44, and the guide mechanism 45. Note that the turning axis 500x in this example is set in the vertical direction.

The turning device 5 in the present embodiment turns the transfer device 4 (specifically, the transfer machines 44, which are parts of the transfer device 4) about the turning axis 500x parallel to the vertical direction, and changes the orientation of the transfer device 4 (transfer machines 44) between a reference orientation P0 (see FIG. 7), in which the delivery side X1 in the transfer direction of the transfer device 4 faces the stacking region 2A, a first orientation P1 (see FIG. 8), in which the delivery side X1 in the transfer direction of the transfer device 4 faces one container rack 8 of a pair of container racks 8, and a second orientation P2 (see FIG. 9), in which the delivery side X1 in the transfer direction of the transfer device 4 faces the other one container rack 8 of the pair of container racks 8. The transfer direction X in the present embodiment is thus changed in a horizontal plane by the turning device 5.

The turning device 5 changes the orientation of the transfer device 4 in accordance with the position of the transfer target location T. Specifically, the turning device 5 switches the turning device 4 to the reference orientation P0 (see FIG. 7) if the transfer target location T is the stacking region 2A, switches the transfer device 4 to the first orientation P1 (see FIG. 8) if the transfer target location T is one container rack 8 of a pair of container racks 8 (shelf section 80), and switches the transfer device 4 to the second orientation P2 (see FIG. 9) if the transfer target location T is the other one container rack 8 of the pair of container racks 8 (shelf sections 80).

In the following, the circumferential direction about the turning axis $500x$ is referred to as a "turning direction Z", one side in the turning direction Z is referred to as a "first side Z1 in the turning direction", and the other side in the turning direction Z is referred to as a "second side Z2 in the turning direction", as representatively shown in FIG. 5 and other figures.

Figure 4:
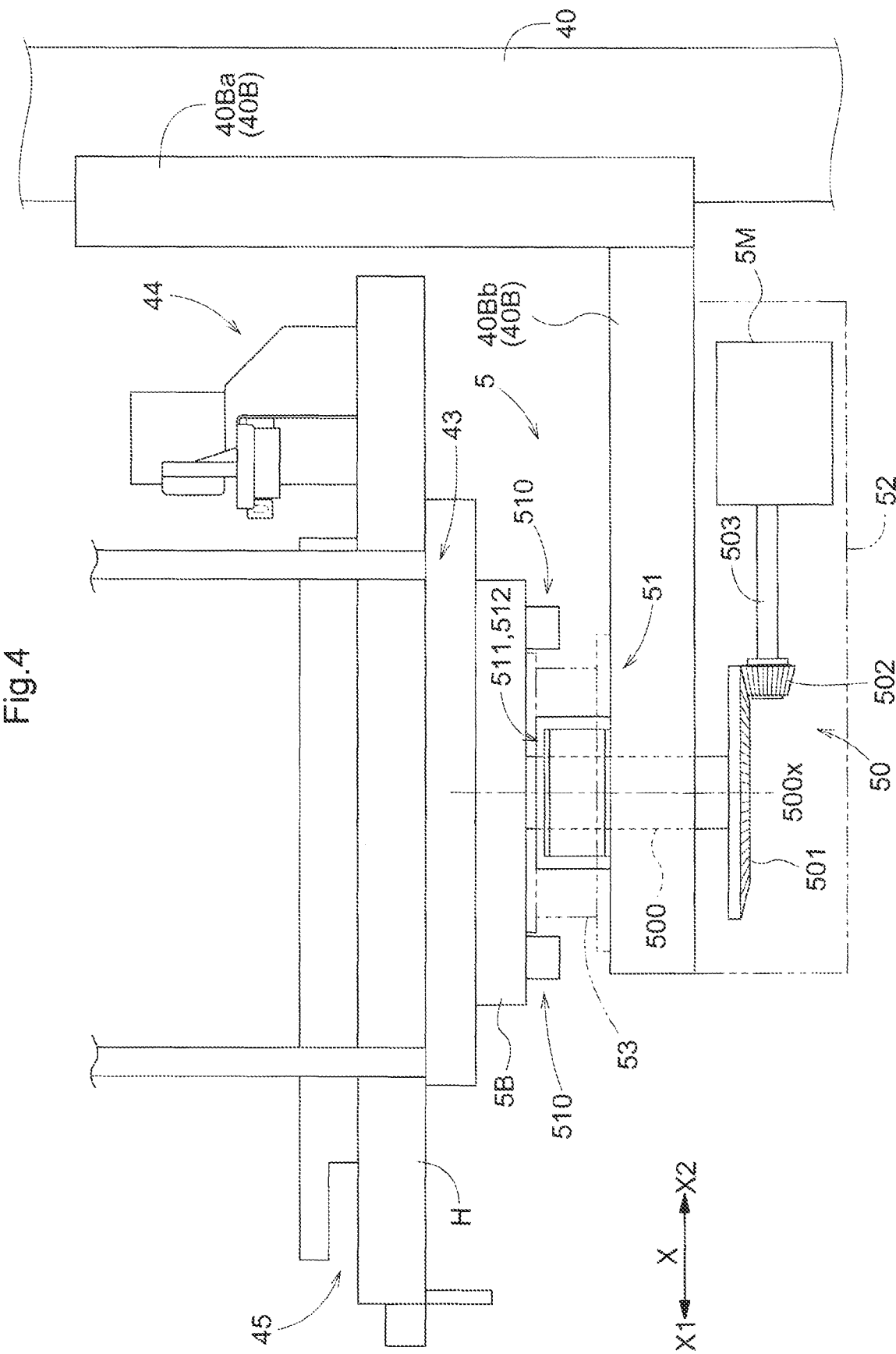
FIG. 4 shows a main part of a turning device and a rattling restriction mechanism as viewed from the width direction of the vehicle body.

The turning device 5 has a turner 5B that supports the holders H and the transfer machines 44 (as well as the guide mechanisms 45 in this example) and turns about the turning axis $500x$ relative to the transfer elevator 40B, a turner drive source 5M for driving the turner 5B to turn, a transmission mechanism 50 for transmitting a turning driving force from the turner drive source 5M to the turner 5B, and a rattling restriction mechanism 51 for restricting rattling in the turning direction Z of the turner 5B caused by backlashes in the transmission mechanism 50, as shown in FIG. 4.

The turner 5B in the present embodiment supports the first unit U1 and the second unit U2 (see also FIG. 3). Specifically, the turner 5B supports the holder joint 43 that integrally connects the first unit U1 to the second unit U2. Accordingly, upon the turner 5B turning, the first unit U1 and the second unit U2 that are supported by the turner 5B via the holder joint 43 also turn together with the turner 5B.

The turner 5B in the present embodiment is turnably joined to the transfer elevator 40B (support body) by a joint member 53. The joint member 53 includes a bearing and the like (not shown). The transfer elevator 40B in this example has a support body joint 40Ba joined to the transfer mast 40, and a support body protrusion 40Bb protruding from the support body joint 40Ba toward the delivery side X1 in the transfer direction. The turner 5B is supported by the support body protrusion 40Bb via the joint member 53.

The transmission mechanism 50 transmits the turning driving force from the turner drive source 5M with use of a gear, a chain and sprockets, or a toothed belt and toothed pulleys, for example. The transmission mechanism 50 is provided with backlashes. "Backlashes" here means "gaps" provided at meshing portions in the transmission mechanism 50, such as meshing portions between gears, meshing portions between the chain and the sprockets, and meshing portions between the toothed belt and the toothed pulleys. The backlashes are provided to appropriately operate the members meshing with each other.

The transmission mechanism 50 in the present embodiment has a turning shaft 500 that rotates about the turning axis $500x$, a first gear 501 that rotates integrally with the turning shaft 500, a second gear 502 that meshes with the first gear 501, and an output shaft 503 that rotates integrally with the second gear 502 and receives the output of the turning driving force from the turner drive source 5M.

The turning shaft 500 in the present embodiment is arranged along the vertical direction, and vertically passes through the support body protrusion 40Bb of the transfer elevator 40B. The turning shaft 500 is supported via a bearing (not shown) in such a manner as to relatively rotate with respect to the support body protrusion 40Bb. The turning shaft 500 in the present embodiment is joined to the turner 5B above the support body protrusion 40Bb, and is joined to the first gear 501 below the support body protrusion 40Bb.

The first gear 501 rotates integrally with the turning shaft 500, and meshes with the second gear 502. The first gear 501 in the shown example is joined to a lower end portion of the turning shaft 500.

The second gear 502 rotates integrally with the output shaft 503, and meshes with the first gear 501. The second gear 502 in the shown example is joined to an end portion, on the delivery side X1 in the transfer direction, of the output shaft 503.

The output shaft 503 is a member to which the turning driving force from the turner drive source 5M is output. The output shaft 503 in the present embodiment is arranged along the transfer direction X. The output shaft 503 is connected, at the end portion on the delivery side X1 in the transfer direction, to the second gear 502, and is connected, at an end portion on the pick-up side X2 in the transfer direction, to the turner drive source 5M.

In the present embodiment, the turning shaft 500 is arranged along the vertical direction, and the output shaft 503 is arranged along the transfer direction X (horizontal direction), as described above. That is, the extension direction of the turning shaft 500 intersects the extension direction of the output shaft 503 (in this example, the extension direction of the turning shaft 500 is orthogonal to the extension direction of the output shaft 503). For this reason, the first gear 501, which is joined to the turning shaft 500, and the second gear 502, which is joined to the output shaft 503 and meshes with the first gear 501, are constituted by bevel gears. This configuration reduces the length in the vertical direction of the transmission mechanism 50.

In the present embodiment, the elements of the transmission mechanism 50 that are arranged below the support body protrusion 40Bb are covered by a case 52. Specifically, a part of the turning shaft 500, the first gear 501, the second gear 502, and the output shaft 503 are covered by the case 52. In addition, the turner drive source 5M is also covered by the case 52 in this example.

In the present embodiment, the aforementioned backlashes (not shown) are provided at meshing portions between the first gear 501 and the second gear 502. This configuration allows the first gear 501 and the second gear 502 to operate appropriately with respect to each other. Meanwhile, these backlashes may cause the turner 5B to rattle in the turning direction Z (see FIG. 5). This may further cause the transfer machine 44 supported by the turner 5B to rattle in the turning direction Z. The technique according to the present disclosure reduces rattling in the turning direction Z of the transfer machine 44 caused by the backlashes with use of the rattling restriction mechanism 51. The following is a detailed description.

Figure 5:
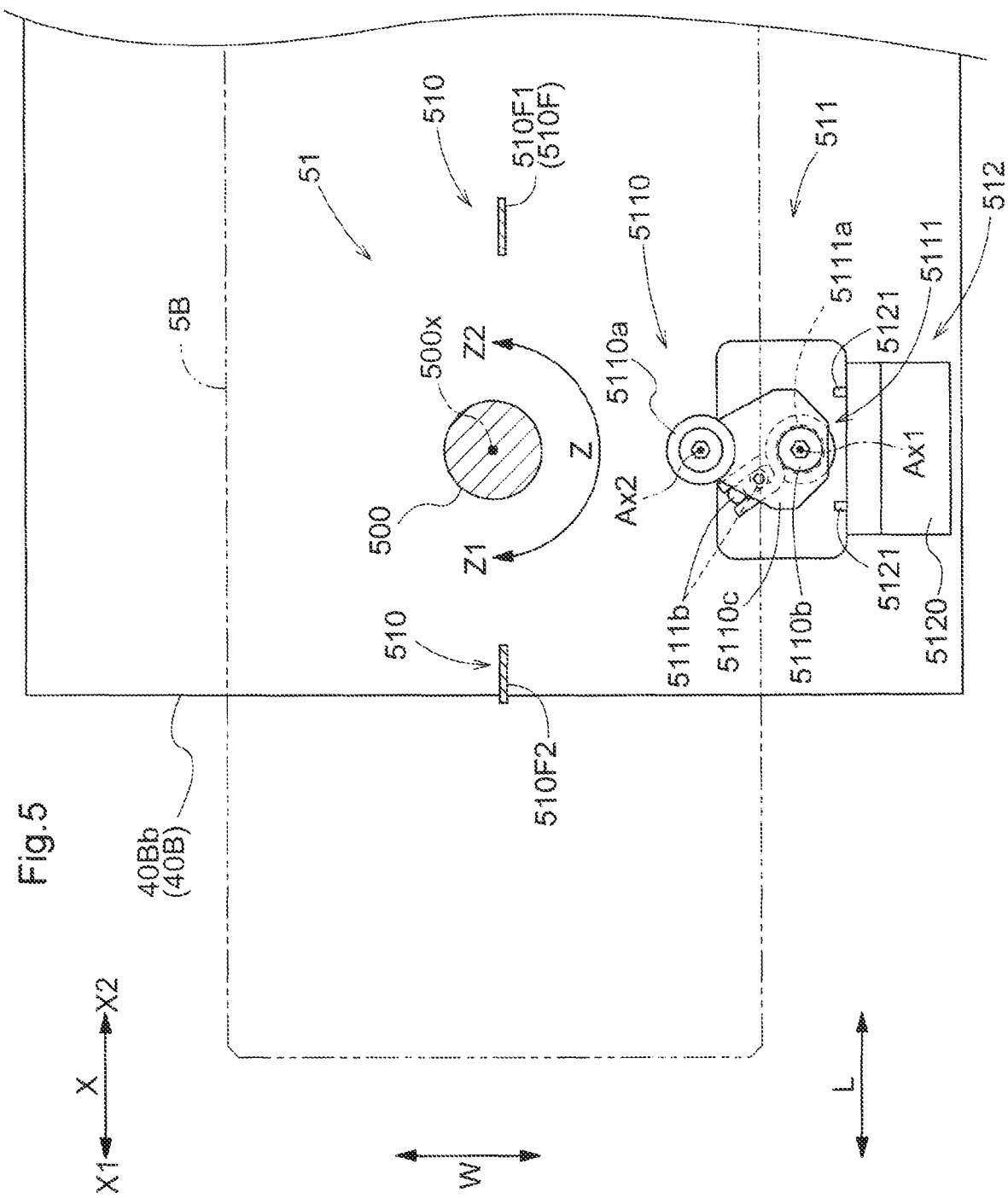
FIG. 5 is a plan view of a main part of the rattling restriction mechanism.

The rattling restriction mechanism 51 has a pushed portion 510 that rotates in conjunction with the turning of the turner 5B, and a restriction section 511 supported by the transfer elevator 40B, as shown in FIGS. 4 and 5.

The pushed portion 510 in the present embodiment is fixed to the turner 5B. The pushed portion 510 in this example protrudes downward from the turner 5B, and faces the transfer elevator 40B (here, the support body protrusion 40Bb) from above.

The pushed portion 510 has a pushed face 510F facing in the turning direction Z, as shown in FIG. 5. The pushed face 510F is spaced apart from the turning axis $500x$ in the radial direction based on the turning axis $500x$. The pushed face 510F moves in the turning direction Z about the turning axis 500x in conjunction with the turning of the turner 5B. The pushed face 510F in the present embodiment is a flat face extending in the radial direction of the turning axis 500x and a direction (vertical direction in this example) parallel to the turning axis 500x.

The pushed portion 510 in the present embodiment has a first pushed face 510F1 serving as the pushed face 510F, and also a second pushed face 510F2. The first pushed face 510F1 is a face facing the first side Z1 in the turning direction. The second pushed face 510F2 is a face facing the second side Z2 in the turning direction at a different position in the turning direction Z from the first pushed face 510F1. Similar to the first pushed face 510F1, the second pushed face 510F2 is also a flat face extending in the radial direction of the turning axis 500x and a direction (vertical direction in this example) parallel to the turning axis 500x. The pushed portion 510 in the present embodiment includes two plate-shaped members spaced apart in the turning direction Z. One of the two plate-shaped members has the first pushed face 510F1, and the other one of the two plate-shaped members has the second pushed face 510F2.

The second pushed face 510F2 is spaced apart from the turning axis 500x in the radial direction based on the turning axis 500x. The second pushed face 510F2 in this example is arranged on the opposite side to the first pushed face 510F1 with the turning axis 500x therebetween. Specifically, the first pushed face 510F1, the turning axis 500x, and the second pushed face 510F2 are arranged in a line as viewed in the vertical direction. The second pushed face 510F2 moves in the turning direction Z about the turning axis 500x in conjunction with the turning of the turner 5B. The first pushed face 510F1 and the second pushed face 510F2 in this example move in the turning direction Z about the turning axis 500x while maintaining the positional relationship therebetween. In other words, the first pushed face 510F1 and the second pushed face 510F2 move in the turning direction Z about the turning axis 500x while maintaining the state of being arranged on the opposite sides of the turning axis 500x.

A specific range SR is set in a part of the movable range of the first pushed face 510F1 that moves in the turning direction Z, as shown in FIG. 6. This specific range SR is referred to as a first specific range SR1 in the present embodiment. A second specific range SR2 is set, separately from the first specific range SR1, in a part of the movement range of the second pushed face 510F2 that moves in the turning direction Z.

The restriction section 511 includes a contact member 5110, which is arranged in a movement path of the first pushed face 510F1 that moves in conjunction with the turning of the turner 5B and comes into contact with the first pushed face 510F1 while the first pushed face 510F1 is positioned in the first specific range SR1 in the turning direction Z, and a biasing mechanism 5111 for biasing the contact member 5110 in contact with the first pushed face 510F1, toward the first pushed face 510F1 in the turning direction Z, as shown in FIGS. 5 and 6. The contact member 5110 in the present embodiment is also arranged in a movement path of the second pushed face 510F2 that moves in conjunction with the turning of the turner 5B, and comes into contact with the second pushed face 510F2 while the second pushed face 510F2 is positioned in the second specific range SR2 in the turning direction Z. The biasing mechanism 5111 biases the contact member 5110 in contact with the second pushed face 510F2, toward the second pushed face 510F2 in the turning direction Z.

That is, the contact member 5110 in the present embodiment comes into contact with the first pushed face 510F1 from the first side Z1 in the turning direction while the first pushed face 510F1 is positioned in the first specific range SR1. The biasing mechanism 5111 biases the contact member 5110 toward the second side Z2 in the turning direction while the contact member 5110 is in contact with the first pushed face 510F1 from the first side Z1 in the turning direction. Also, the contact member 5110 comes into contact with the second pushed face 510F2 from the second side Z2 in the turning direction while the second pushed face 510F2 is positioned in the second specific range SR2 in the turning direction Z. The biasing mechanism 5111 biases the contact member 5110 toward the first side Z1 in the turning direction while the contact member 5110 is in contact with the second pushed face 510F2 from the second side Z2 in the turning direction.

The contact member 5110 in the present embodiment is allowed to move in a predetermined range in the pushing direction while being pushed toward the first side Z1 in the turning direction by the first pushed face 510F1. The allowed predetermined range corresponds to the first specific range SR1. In other words, the first specific range SR1 corresponds to the allowable movement range of the contact member 5110 while being pushed by the first pushed face 510F1.

Further, the contact member 5110 in the present embodiment is allowed to move in a predetermined range in the pushing direction while being pushed toward the second side Z2 in the turning direction by the second pushed face 510F2. The allowed predetermined range corresponds to the second specific range SR2. In other words, the second specific range SR2 corresponds to the allowable movement range of the contact member 5110 while being pushed by the second pushed face 510F2.

The contact member 5110 in the present embodiment has a contact portion 5110a that comes into contact with the first pushed face 510F1, and a pivotable body 5110c that supports the contact portion 5110a and is pivotable about a pivot axis Ax1, as shown in FIG. 5. The pivot axis Ax1 is parallel to the turning axis 500x and spaced apart from the turning axis 500x. The pivot axis Ax1 in this example is located farther from the turning axis 500x than the arc-shaped movement path of the first pushed face 510F1 (and the second pushed face 510F2) that extends in the turning direction Z. The contact member 5110 in the present embodiment has a pivot shaft 5110b, which pivotably joins the pivotable body 5110c to the transfer elevator 40B. The pivot shaft 5110b is arranged along the pivot axis Ax1.

The contact portion 5110a is a portion that comes into contact with the first pushed face 510F1, and is also a portion that comes into contact with the second pushed face 510F2. The contact portion 5110a in the present embodiment is a roller that is supported rotatably about a rotation axis Ax2 relative to the pivotable body 5110c. The rotation axis Ax2 is parallel to the pivot axis Ax1 and spaced apart from the pivot axis Ax1. The rotation axis Ax2 in this example is located closer to the turning axis 500x than the pivot axis Ax1. In the present embodiment, the turning axis 500x, the pivot axis Ax1, and the rotation axis Ax2 are parallel to each other.

The biasing mechanism 5111 in the present embodiment includes a spring member 5111a for biasing the pivotable body 5110c toward a reference position in a pivot direction (a direction about the pivot axis Ax1), and a spring lock portion 5111b for locking a part of the spring member 5111a. The spring member 5111a in this example is a helical coil spring formed with an elastic coiled wire member, and is fitted onto the pivot shaft 5110b. Both end portions of the linear member constituting the spring member 5111a are arranged in a radial direction based on the pivot axis Ax1, and are locked by the spring lock portion 5111b. The spring member 5111a attempts to rotate with the pivoting of the pivotable body 5110c, but a part of the spring member 5111a is locked by the spring lock portion 5111b as mentioned above. The spring member 5111a therefore attempts to return to its original shape due to the elastic force while deforming with the pivoting of the pivotable body 5110c. The biasing mechanism 5111 thus biases the pivotable body 5110c toward the reference position in the pivot direction (a direction about the pivot axis Ax1). Note that the elastic force from the spring member 5111a is not exerted on the pivotable body 5110c while the pivotable body 5110c is stopped at the reference position in the pivot direction.

The rattling restriction mechanism 51 in the present embodiment has a stopper 512 for restricting the range in which the contact member 5110 is movable while being pushed by the first pushed face 510F1 (or the second pushed face 510F2) to a fixed range. The stopper 512 restricts movement of the contact member 5110 in the pushing direction while the contact member 5110 is being pushed by the first pushed face 510F1 (or the second pushed face 510F2) to the aforementioned allowable movement range.

The stopper 512 in the present embodiment includes a fixed portion 5120 fixed to the transfer elevator 40B, and protruding pins 5121 protruding from the fixed portion 5120 toward the pivotable body 5110c.

The fixed portion 5120 in the present embodiment is provided with two protruding pins 5121. One of the two protruding pins 5121 comes into contact with a part of the contact member 5110 that is pushed to move by the first pushed face 510F1, and restricts movement of the contact member 5110 beyond the allowable movement range. Specifically, one of the two protruding pins 5121 comes into contact with the pivotable body 5110c to restrict excessive pivoting of the pivotable body 5110c while the pivotable body 5110c is pivoting due to the contact portion 5110a being pushed by the first pushed face 510F1. The other one of the two protruding pins 5121 comes into contact with a part of the contact member 5110 pushed to move by the second pushed face 510F2, and restrict movement of the contact member 5110 beyond the allowable movement range. Specifically, the other one of the two protruding pins 5121 comes into contact with the pivotable body 5110c to restrict excessive pivoting of the pivotable body 5110c while the pivotable body 5110c is pivoting due to the contact portion 5110a being pushed by the second pushed face 510F2.

Figure 7:
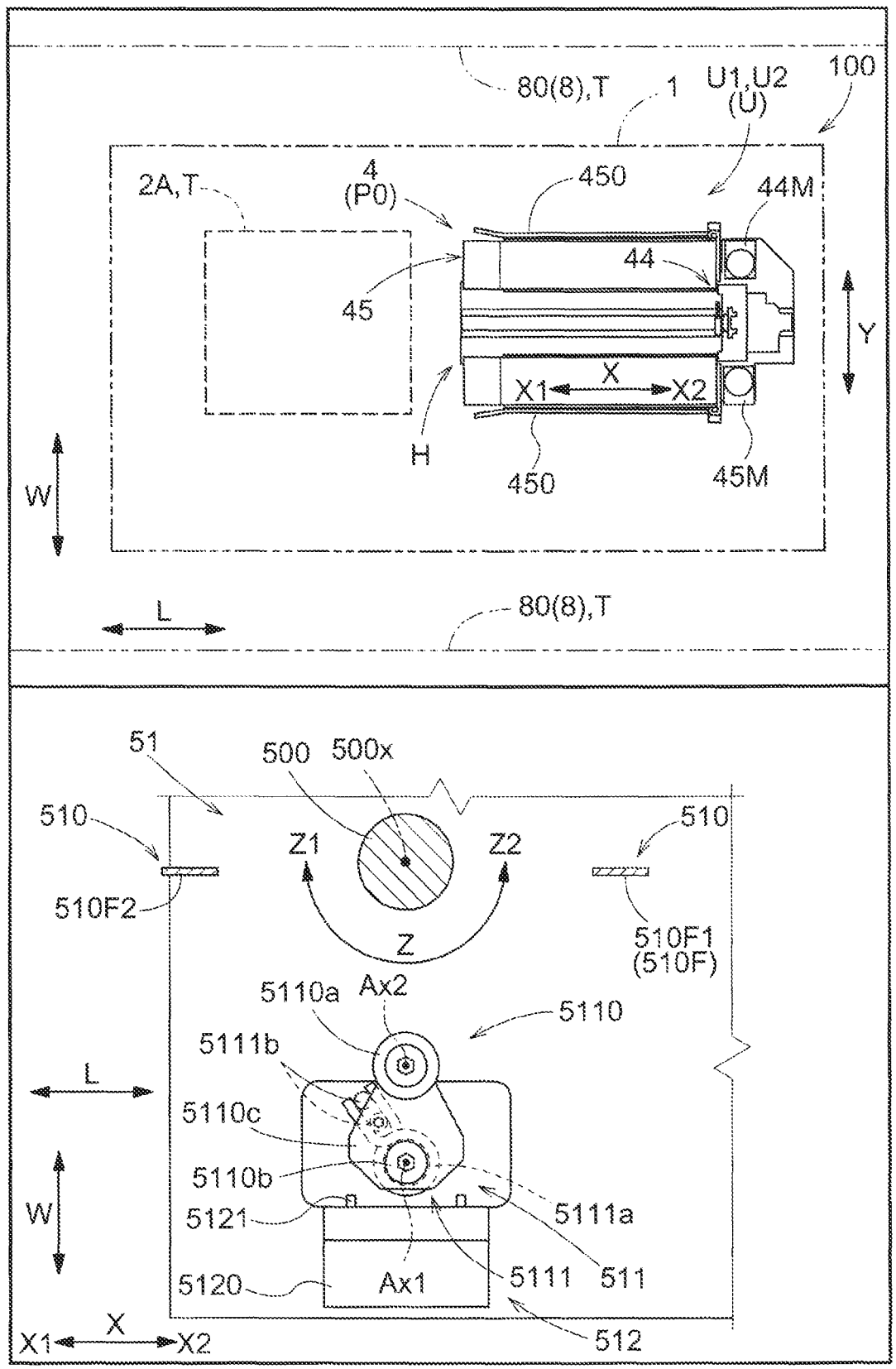
FIG. 7 illustrates the state of the rattling restriction mechanism while the transfer device is in a reference orientation.
Figure 8:
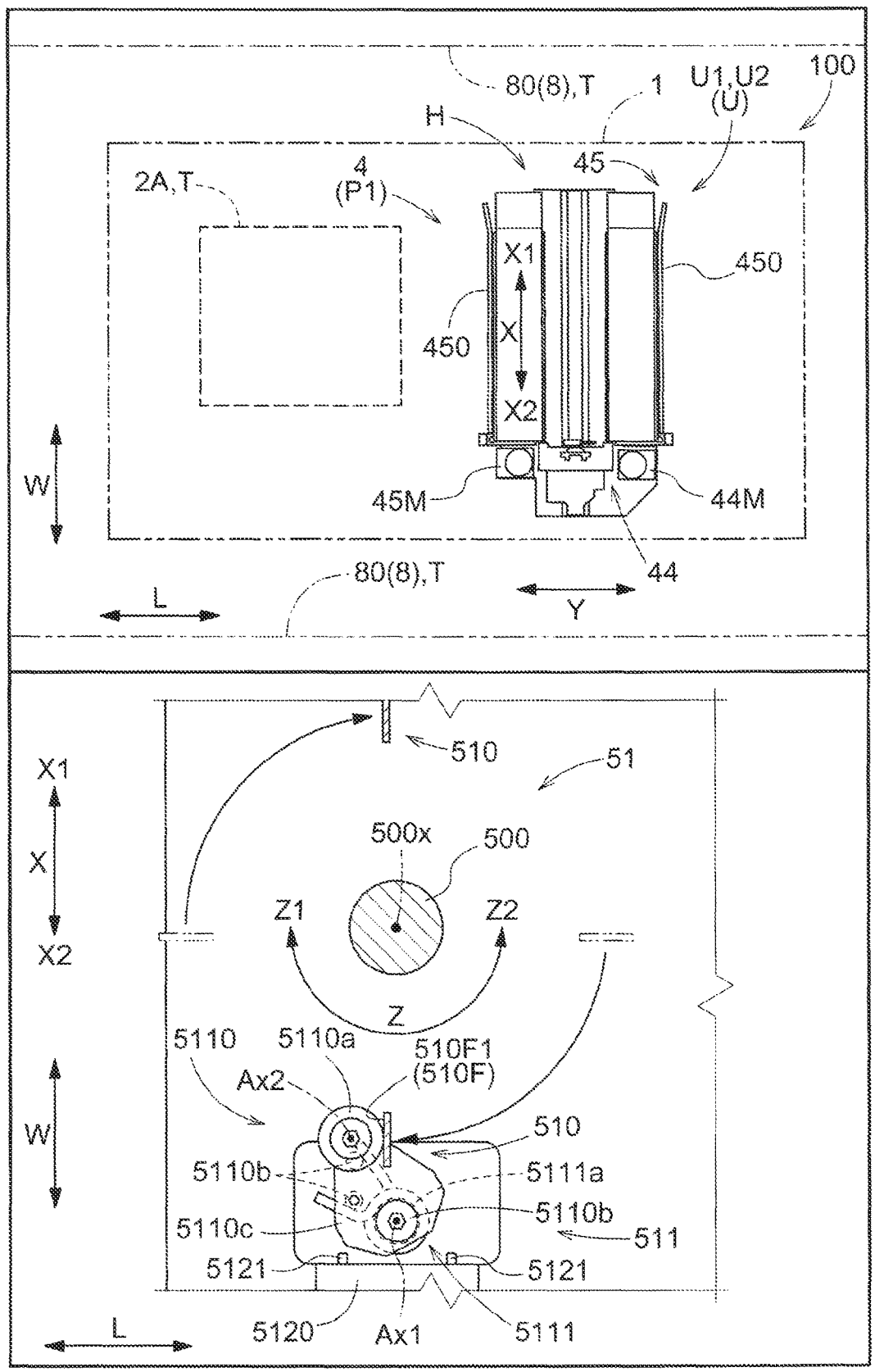
FIG. 8 illustrates the state of the rattling restriction mechanism while the transfer device is in a first orientation.
Figure 9:
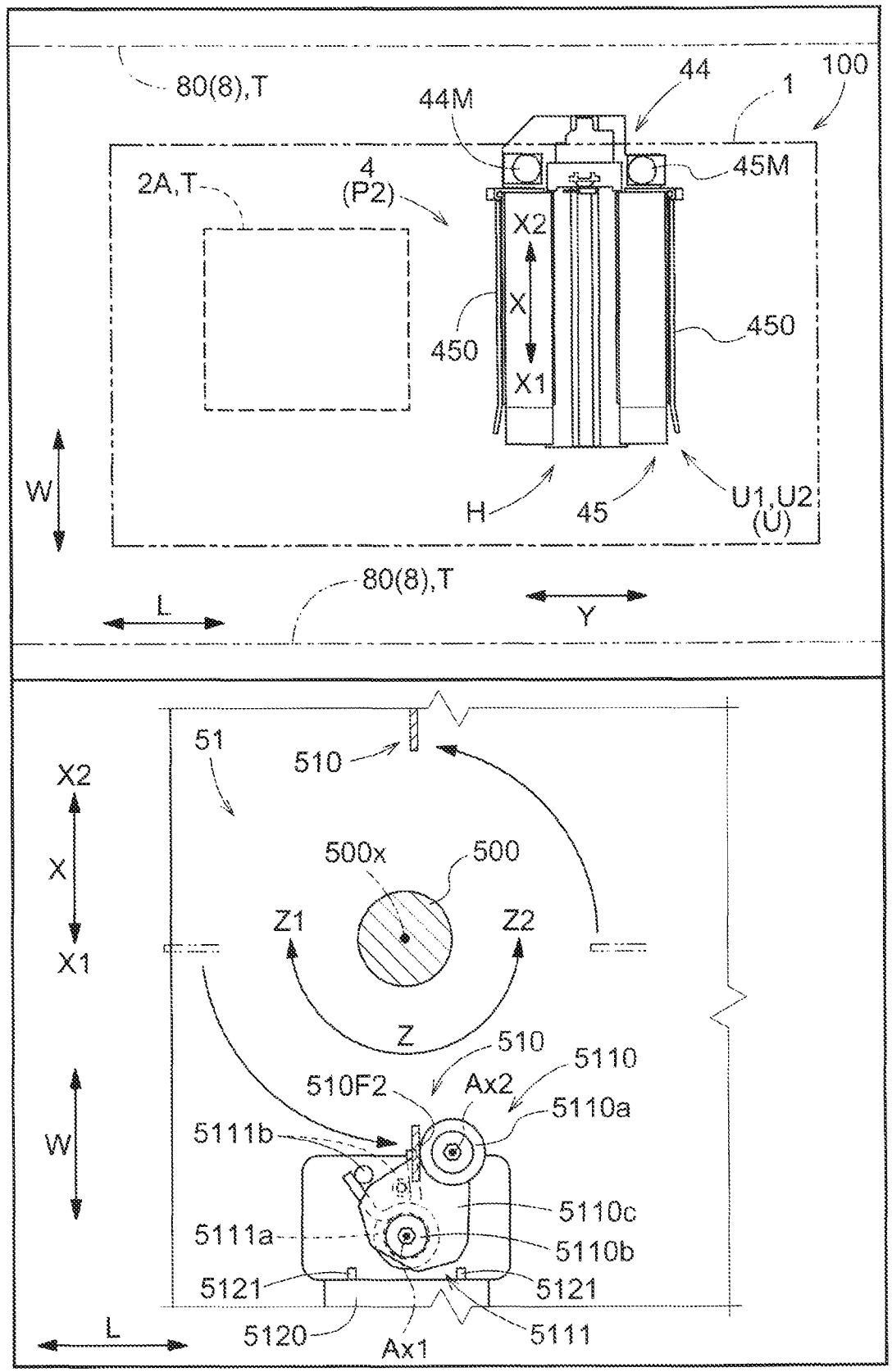
FIG. 9 illustrates the state of the rattling restriction mechanism while the transfer device is in a second orientation.

FIGS. 7 to 9 show the correspondence relationship between the orientation of the transfer device 4 and the state of the rattling restriction mechanism 51. The transfer device 4 changes in orientation between the reference orientation P0 (see FIG. 7) in which the delivery side X1 in the transfer direction of the transfer device 4 faces the stacking region 2A, the first orientation P1 (see FIG. 8) in which the delivery side X1 in the transfer direction of the transfer device 4 faces one of a pair of container racks 8, and the second orientation P2 (see FIG. 9) in which the delivery side X1 in the transfer direction of the transfer device 4 faces the other one of the pair of container racks 8, as mentioned above.

FIG. 7 shows the transfer device 4 in the reference orientation P0, and the rattling restriction mechanism 51 while the transfer device 4 is in the reference orientation P0. While the transfer device 4 is in the reference orientation P0, the transfer direction X is parallel to the front-back direction L of the vehicle body, and the delivery side X1 in the transfer direction of the transfer device 4 faces the stacking region 2A, as shown in FIG. 7. In the present embodiment, neither the first pushed face 510F1 nor the second pushed face 510F2 comes into contact with the contact member 5110 while the transfer device 4 is in the reference orientation P0. Both the first pushed face 510F1 and the second pushed face 510F2 in this example are arranged along the front-back direction L of the vehicle body while the transfer device 4 is in the reference orientation P0.

FIG. 8 shows the transfer device 4 in the first orientation P1, and the rattling restriction mechanism 51 while the transfer device 4 is in the first orientation P1. While the transfer device 4 is in the first orientation P1, the transfer direction X is parallel to the width direction W of the vehicle body, and the delivery side X1 in the transfer direction of the transfer device 4 faces one of a pair of container racks 8, as shown in FIG. 8. The first pushed face 510F1 in the present embodiment comes into contact with the contact member 5110 from the second side Z2 in the turning direction while the transfer device 4 is in the first orientation P1. The biasing mechanism 5111 biases, toward the second side Z2 in the turning direction, the contact member 5110 in contact with the first pushed face 510F1. This configuration makes it possible to exert, on the transmission mechanism 50, a force that causes members (the first gear 501 and the second gear 502 in this example) meshing with each other at meshing portions in the transmission mechanism 50 (see FIG. 4) to push each other in the meshing direction (circumferential direction). Backlashes in the transmission mechanism 50 can thus be reduced. Accordingly, rattling in the turning direction Z of the transfer machine 44 caused by the backlashes can be reduced.

FIG. 9 shows the transfer device 4 in the second orientation P2, and the rattling restriction mechanism 51 while the transfer device 4 is in the second orientation P2. While the transfer device 4 is in the second orientation P2, the transfer direction X is parallel to the width direction W of the vehicle body, and the delivery side X1 in the transfer direction of the transfer device 4 faces the other one of the pair of container racks 8 as shown in FIG. 9. The second pushed face 510F2 in the present embodiment comes into contact with the contact member 5110 from the first side Z1 in the turning direction while the transfer device 4 is in the second orientation P2. The biasing mechanism 5111 biases, toward the first side Z1 in the turning direction, the contact member 5110 in contact with the second pushed face 510F2. This configuration makes it possible to exert, on the transmission mechanism 50, a force that causes members (the first gear 501 and the second gear 502 in this example) meshing with each other at meshing portions in the transmission mechanism 50 (see FIG. 4) to push each other in the meshing direction (circumferential direction). Backlashes in the transmission mechanism 50 can thus be reduced. Accordingly, rattling in the turning direction Z of the transfer machine 44 caused by the backlash can be reduced.

Transfer Operation

Next, transfer operations, namely operations to transfer a container 70 performed by the transfer device 4 will be described. FIGS. 10 to 15 each illustrate the transfer device 4 performing the operation (deliver operation or pick-up operation) to transfer a container 70 to or from the transfer target location T.

FIGS. 10 to 12 show operations to transfer containers 70 to and from shelf sections 80. The transfer device 4 in the present embodiment transfers a container 70 to or from a shelf section 80 while assuming the aforementioned first orientation P1 (see FIG. 8) or second orientation P2 (see FIG. 9).

FIGS. 10 and 11 show the operation (transfer operation) to pick up a container 70 from a shelf section 80, and illustrates the case of picking up a container 70 stored in a shelf section 80 and pulling the container 70 to the holder H with use of the transfer machine 44 of the first unit U1. In this case, the controller 6 (see FIG. 3) aligns the position of the transfer machine 44 with a reference position 80P (see FIG. 2) on the shelf section 80, and thereafter pulls the container 70 toward the pick-up side X2 in the transfer direction with use of the lockable portion 442. Specifically, the controller 6 causes the lockable portion 442 of the first unit U1 to assume the locking orientation, and relatively moves the lockable portion 442 locked to the container 70 toward the pick-up side X2 in the transfer direction with respect to the holder H. The container 70 to be picked up is thus pulled to the holder H.

The transfer device 4 in the present embodiment has a reference position detection sensor Se1 for detecting a reference position 80P (see FIG. 2) on the shelf sections 80. The reference positions 80P are positions each serving as a reference for storing a container 70 in a shelf section 80, as mentioned above.

The reference position detection sensor Se1 detects the positional relationship between the transfer device 4 having the reference position detection sensor Se1 and a reference position 80P on a shelf section 80 by detecting a target point 82T provided on a beam member 82. A container 70 can be appropriately transferred to and from the shelf section 80 by performing an operation to controlling the traveling body 1, the turning device 5, and the transfer elevator drive unit 40M and correcting the position of the transfer device 4 based on the result of the reference position detection sensor Se1 detecting the target point 82T. The reference position detection sensor Se1 in this example is constituted by a camera. The reference position detection sensor Se1, which is configured as a camera, can detect the positional relationship between the transfer device 4 and the target point 82T provided on the beam member 82 through image recognition. For example, the reference position detection sensor Se1 may function as a ranging sensor for detecting the distance from a target.

The guide mechanism 45 in the present embodiment brings the two guide portions 450 close to each other in the width direction Y while the transfer machine 44 is performing the operation to pick up a container 70, as shown in FIG. 11. In other words, the guide mechanism 45 switches the spacing between the two guide portions 450 from the wide spacing Dw to the reference spacing Ds in parallel with the operation to pick up the container 70 performed by the transfer machine 44. It is thus possible to appropriately guide, to the holder H, the container 70 moving from the delivery side X1 in the transfer direction toward the pick-up side X2 in the transfer direction due to the pick-up operation.

FIG. 12 shows the operation (transfer operation) to deliver a container 70 to a shelf section 80, and illustrates the case of delivering a container 70 held by the holder H to the shelf section 80 with use of the transfer machine 44 of the second unit U2. In this case, the controller 6 (see FIG. 3) pushes the container 70 toward the delivery side X1 in the transfer direction with use of the pusher 441 if it is determined that no other container 70 is stored in a space in the shelf section 80 to which the container 70 is to be delivered. Specifically, the controller 6 relatively moves the container 70 toward the delivery side X1 in the transfer direction with respect to the holder H while bringing the pusher 441 of the second unit U2 into contact with the container 70. The container 70 to be delivered is thus pushed to the shelf section 80 (transfer target location T).

The transfer device 4 in the present embodiment also has a stored container detection sensor Se2 for detecting a container 70 stored in a shelf section 80.

When the transfer device 4 performs the delivery operation to transfer a container 70 to the shelf section 80, the stored container detection sensor Se2 detects whether or not another container 70 is present in a space in a shelf section 80 to which the transfer device 4 is about to deliver the container 70. The transfer device 4 performs the operation to deliver the container 70 to the shelf section 80 if the stored container detection sensor Se2 detects no container 70 in the target space in the shelf section 80 that is the delivery destination. If the stored container detection sensor Se2 detects that another container 70 is present in the target space in the shelf section 80 that is the delivery destination, the transfer device 4 may transfer the container 70 to another vacant space in the shelf section 80, or may stop transferring the container 70. For example, the stored container detection sensor Se2 may be configured as a ranging sensor for detecting the distance from a target. This configuration enables the transfer device 4 to perform the transfer operation while measuring the distance from the transfer target location T. The stored container detection sensor Se2 in the present embodiment is configured as an optical sensor that projects light to a target. However, the stored container detection sensor Se2 is not limited to this configuration, and may alternatively be configured using any known means, such as an ultrasonic sensor or a camera.

Note that the guide mechanism 45 in the present embodiment maintains the spacing between the two guide portions 450 at the reference spacing Ds while the transfer machine 44 is performing the operation to deliver a container 70. The container 70 to be delivered can thus be appropriately guided to the shelf section 80 (transfer target location T).

Figure 15:
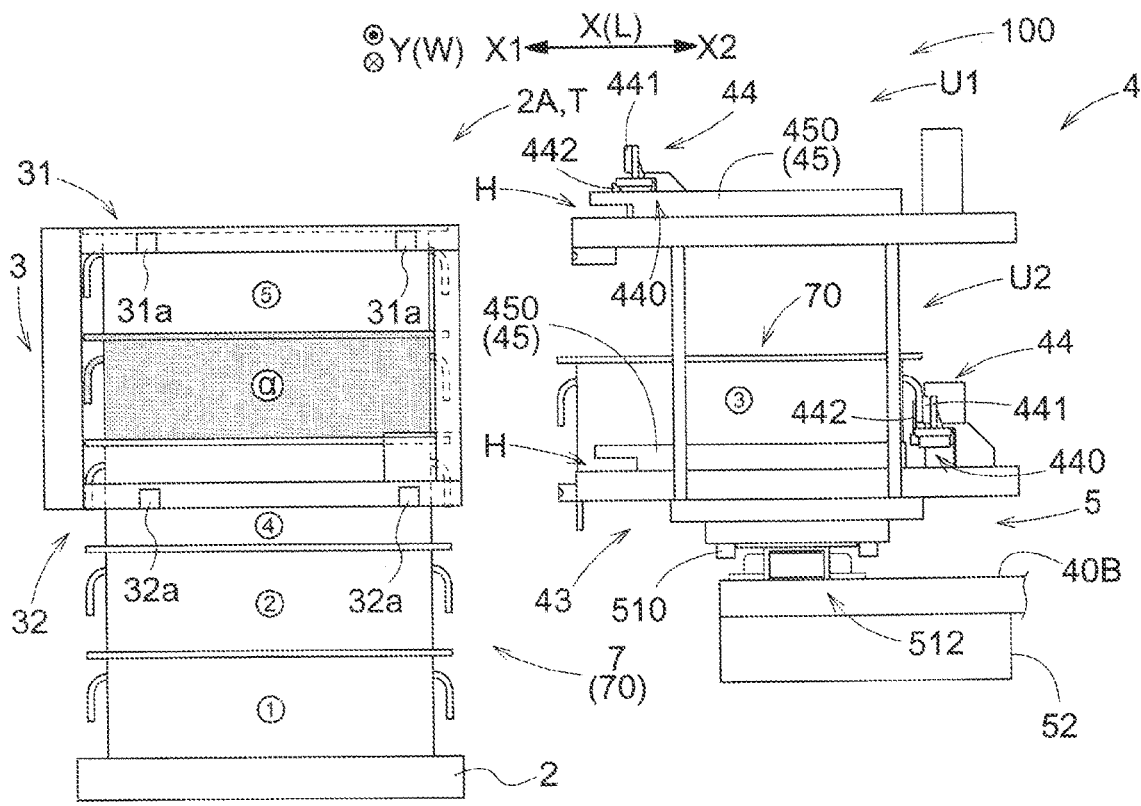
FIG. 15 illustrates parallel operations to pick up and deliver containers from and to the stacking region.

FIGS. 13 to 15 shows the operation to transfer a container 70 to the stacking region 2A. The transfer device 4 in the present embodiment transfers a container 70 to the stacking region 2A while assuming the aforementioned reference orientation P0 (see FIG. 7).

The lift device 3 in the present embodiment can form spaces in the vertical direction between a plurality of containers 70 stacked in the stacking region 2A, as mentioned above. The transfer device 4 transfers containers 70 to and from the stacking region 2A with use of these spaces. The transfer device 4 in the present embodiment performs the operation to pick up a container 70 and the operation to deliver a container 70 from and to the stacking region 2A. Specifically, the transfer device 4 performs parallel operations to pick up and deliver containers 70 in parallel from and to the stacking region 2A.

FIGS. 13 to 15 show an example where five containers 70 are stacked as a container group 7 in the stacking region 2A. In the figures, numerals "1 to 5" are assigned to the stacked containers 70 in ascending order. Also, letter "a" is assigned to the container 70 to be delivered that is held by the holder H of the first unit U1. In the following example, the container 70 (container "a") to be delivered is delivered onto a fourth container 70 (container "4") with use of the space that is formed in the vertical direction between a fifth container 70 (container "5") and the fourth container 70 (container "4") by the lift device 3. Further, a third container 70 (container "3") is picked up with use of a space that is formed below the fourth container 70 (container "4") by the lift device 3, in parallel with the above delivery operation.

The controller 6 (see FIG. 3) causes the lockable portion 442 of the second unit U2 to assume the locking orientation, and relatively moves the lockable portion 442 locked to the container 70 (container "3") toward the pick-up side X2 in the transfer direction with respect to the holder H, as shown in FIG. 14. The controller 6 relatively moves the pusher 441 toward the delivery side X1 in the transfer direction with respect to the holder H while pushing, with the pusher 441, the container 70 (container "a") held by the holder H of the first unit U1, in parallel with the above pick-up operation. As a result, the lockable portion 442 of the second unit U2 pulls the container 70 (container "3") to be picked up toward the pick-up side X2 in the transfer direction, and the pusher 441 of the first unit U1 pushes the container 70 (container "a") to be delivered, toward the delivery side X1 in the transfer direction.

The controller 6 then arranges, on the holder H of the second unit U2, the container 70 (container "3") to be picked up that is pulled by the lockable portion 442 of the second unit U2, and arranges the container 70 (container "a") to be delivered that is pushed by the pusher 441 of the first unit U1 above the container 70 (container "4") lifted by the second lift holder 32a and fits the container "a" to the container "4". The container group 7 in the stacking region 2A thus enters the state shown in FIG. 15. That is, one container 70 (container "3") of the plurality of containers 70 arranged in the stacking region 2A is replaced with a new container 70 (container "a").

Other Embodiments

Next, other embodiments of the transport apparatus will be described.

(1) The above embodiment has described an example where the transmission mechanism 50 has a first gear 501 that rotates integrally with the turning shaft 500, and a second gear 502 that meshes with the first gear 501. However, the transmission mechanism 50 may also have a plurality of different gears in addition to the first gear 501 and the second gear 502.

(2) The above embodiment has described an example where backlashes are provided at meshing portions between the first gear 501 and the second gear 502. However, there is no limitation to this example. If the transmission mechanism 50 have a plurality of different gears in addition to the first gear 501 and the second gear 502, backlashes may also be provided to meshing portions between these gears. Further, if the transmission mechanism 50 has, for example, a chain and sprockets or a toothed belt and toothed pulleys, backlashes may be provided at meshing portions between the chain and the sprockets, or meshing portions between the toothed belt and the toothed pulleys. Alternatively, backlashes may be provided at a part of a decelerator for decelerating rotation of the turner drive source 5M, which is a motor. In this case, the decelerator is also a part of the transmission mechanism 50. The above backlashes provided at various locations may cause rattling in the turning direction Z of the turner 5B. The rattling restriction mechanism 51 can reduce rattling in the turning direction Z of the transfer machine 44 caused by those backlashes.

(3) The above embodiment has described an example where the extension direction of the turning shaft 500 intersects the extension direction of the output shaft 503. However, there is no limitation to this example. The extension direction of the turning shaft 500 may be parallel to the extension direction of the output shaft 503. In other words, the turning shaft 500 and the output shaft 503 may extend in the same direction. In this case, the first gear 501 and the second gear 502 that mesh with each other are favorably gears other than bevel gears (e.g., spur gears).

(4) The above embodiment has described an example where the pushed face 510F is a flat face extending in the radial direction of the turning axis 500x and a direction parallel to the turning axis 500x. However, there is no limitation to this example. The pushed face 510F need only face the turning direction Z. Accordingly, the pushed face 510F may alternatively be a curved face, or may include a flat face portion and a curved face portion.

(5) The above embodiment has described an example where the pushed portion 510 includes two plate-shaped members spaced apart in the turning direction Z, one of the two plate-shaped members has the first pushed face 510F1, and the other one has the second pushed face 510F2. However, there is no limitation to this example. The pushed portion 510 may be configured as one member, and this member may have both the first pushed face 510F1 and the second pushed face 510F2.

(6) The above embodiment has described an example where the pushed portion 510 has a second pushed face 510F2 in addition to a first pushed face 510F1 serving as the pushed face 510F. However, there is no limitation to this example. The pushed portion 510 need not have the second pushed face 510F2. Alternatively, the pushed portion 510 may have one or more other pushed faces in addition to the first pushed face 510F1 and the second pushed face 510F2. The number of pushed faces is favorably set in accordance with the number of transfer target locations T, i.e., the number of set turning-stop positions of the transfer machine 44.

(7) The above embodiment has described an example where both the first pushed face 510F1 and the second pushed face 510F2 are arranged along the front-back direction L of the vehicle body while the transfer device 4 is in the reference orientation P0. However, there is no specific limitation to the direction along which the first pushed face 510F1 and the second pushed face 510F2 are arranged while the transfer device 4 is in the reference orientation P0. For example, both the first pushed face 510F1 and the second pushed face 510F2 may alternatively be arranged along the width direction W of the vehicle body while the transfer device 4 is in the reference orientation P0. In this case as well, the restriction section 511 is arranged at a position according to the first pushed face 510F1 and the second pushed face 510F2.

(8) The above embodiment has described an example where the contact member 5110 has a contact portion 5110a, which is a portion that comes into contact with the first pushed face 510F1, and a pivotable body 5110c, which supports the contact portion 5110a and is pivotable about the pivot axis Ax1. However, there is no limitation to this example. The contact member 5110 may have, for example, a linearly movable body that is linearly movable in a tangential direction of the arc-shaped movement path along which the first pushed face 510F1 moves, instead of the pivotable body 5110c.

(9) The above embodiment has described an example where the contact portion 5110a is a roller that is supported rotatably about the rotation axis Ax2 relative to the pivotable body 5110c. However, there is no limitation to this example. The contact portion 5110a may alternatively be fixed to the pivotable body 5110c, or formed integrally with the pivotable body 5110c. In this case, it is preferable that the contact portion 5110*a* is made of a member that is likely to cause less friction even when the contact portion 5110*a* comes into contact with the first pushed face 510F1 or the second pushed face 510F2.

(10) The above embodiment has described an example where the spring member 5111*a* is a helical coil spring. However, there is no limitation to this example. The spring member 5111*a* may be any other coil spring, such as a helical compression spring or an extension spring, or may be a spring having any other structure, such as a leaf spring.

(11) The above embodiment has described an example where the biasing mechanism 5111 has a spring member 5111*a* for biasing the pivotable body 5110*c* toward the reference position in the pivot direction (a direction about the pivot axis Ax1). However, there is no limitation to this example. The biasing mechanism 5111 may have a hydraulic cylinder or a pneumatic cylinder that biases the pivotable body 5110*c* toward the reference position in the pivot direction, instead of the spring member 5111*a*.

(12) The above embodiment has described an example where the rattling restriction mechanism 51 has a stopper 512 for restricting the range in which the contact member 5110 is movable while being pushed by the first pushed face 510F1 (or the second pushed face 510F2) to a fixed range. However, the rattling restriction mechanism 51 need not have this kind of stopper 512. Alternatively, the stopper 512 may be provided separately from the rattling restriction mechanism 51.

(13) The above embodiment has described an example where the transport apparatus 100 has a traveling body that travels on a floor surface. However, there is no limitation to this example. The transport apparatus 100 may alternatively be configured as any other known transport apparatus, such as a stacker crane or a ceiling transport vehicle.

(14) Note that the configuration disclosed in the above embodiment can also be applied in combination with configurations disclosed in other embodiments as long as no contradiction arises. Regarding other configurations as well, the embodiment disclosed in the present specification is merely an example in all respects.

Accordingly, various modifications can be made as appropriate without departing from the gist of the present disclosure.

Summary of the Above Embodiment

The above transport apparatus will be described below.

A transport apparatus that transports an article, the apparatus including:
 a holder configured to hold the article;
 a transfer machine configured to move the article in a transfer direction and transfer the article between the holder and a transfer target location;
 a support body supporting the holder and the transfer machine; and
 a turning device configured to change the transfer direction by turning the holder and the transfer machine relative to the support body about a turning axis orthogonal to the transfer direction,
 the turning device including:
  a turner configured to turn relative to the support body about the turning axis, the turner supporting the holder and the transfer machine;
  a turner drive source configured to drive the turner to turn;
  a transmission mechanism configured to transmit a turning driving force from the turner drive source to the turner; and
  a rattling restriction mechanism configured to restrict rattling in a turning direction of the turner caused by a backlash in the transmission mechanism,
 the rattling restriction mechanism including:
  a pushed portion configured to rotate in conjunction with turning of the turner; and
  a restriction section supported by the support body,
 the pushed portion including a pushed face facing the turning direction, and
 the restriction section including:
  a contact member configured to come into contact with the pushed face while the pushed face is positioned in a specific range in the turning direction, the contact member being arranged in a movement path of the pushed face configured to move in conjunction with the turning of the turner; and
  a biasing mechanism configured to bias the contact member that is in contact with the pushed face, toward the pushed face in the turning direction.

According to this configuration, the contact member comes into contact with the pushed face while the pushed face is positioned in the specific range in the turning direction. The biasing mechanism biases the contact member in contact with the pushed face, toward the pushed face in the turning direction. It is thus possible to exert, on the transmission mechanism, a force that causes members meshing with each other at meshing portions in the transmission mechanism to push each other, and to reduce the backlashes in the transmission mechanism. Accordingly, rattling in the turning direction of the turner and the transfer machine supported by the turner can be reduced. For the above reason, this configuration reduces rattling in the turning direction of the transfer machine caused by the backlashes.

Here, it is preferable that the pushed portion is fixed to the turner, and
 the pushed face is a flat face extending in a radial direction of the turning axis and in a direction parallel to the turning axis.

According to this configuration, the biasing force in the turning direction applied by the biasing mechanism can appropriately be exerted on the turner via the pushed portion. Further, the pushed face is a flat face extending in the radial direction of the turning axis and a direction parallel to the turning axis, and can therefore receive the biasing force efficiently. For the above reason, this configuration enables a shift in the turning direction of the transfer machine to be appropriately suppressed.

It is preferable that the pushed portion further includes a second pushed face in addition to a first pushed face serving as the pushed face,
 the first pushed face is a face facing a first side in the turning direction that is one side in the turning direction,
 the second pushed face is a face facing a second side in the turning direction at a different position in the turning direction from the first pushed face, the second side in the turning direction being another side in the turning direction,
 the contact member is configured to come into contact with the first pushed face from the first side in the turning direction while the first pushed face is positioned in a first specific range serving as the specific range, and come into contact with the second pushed face from the second side in the turning direction while the second pushed face is positioned in a second specific range in the turning direction, and the biasing mechanism is configured to bias the contact member toward the second side in the turning direction while the contact member is in contact with the first pushed face from the first side in the turning direction, and bias the contact member toward the first side in the turning direction while the contact member is in contact with the second pushed face from the second side in the turning direction.

There are cases where two (or more) turning-stop positions of the transfer machine are set for the purpose of transfer to and from the transfer target location. According to this configuration, rattling in the turning direction of the transfer machine can be reduced, whichever of the two turning-stop positions the transfer machine is stopped at, by respectively setting the first specific range and the second specific range in correspondence with the two turning-stop positions. Further, according to this configuration, the above effect can be realized by one contact member and one biasing mechanism for biasing this contact member. Therefore, the apparatus can be easily downsized and simplified compared with the case of an apparatus having more than one contact member and biasing mechanisms.

It is preferable that the contact member includes a contact portion being a portion configured to come into contact with the pushed face, and a pivotable body supporting the contact portion and pivotable about a pivot axis, the pivot axis is parallel to the turning axis and spaced apart from the turning axis, and the biasing mechanism includes a spring member configured to bias the pivotable body toward a reference position in a pivot direction.

According to this configuration, the restriction section can be realized with a relatively simple configuration.

In the above configuration, it is preferable that the contact portion is a roller supported rotatably about a rotation axis relative to the pivotable body, and the rotation axis is parallel to the pivot axis and spaced apart from the pivot axis.

According to this configuration, friction occurring between the pushed face and the contact portion can be reduced even if the pushed face further turns toward the contact portion while the pushed face is in contact with the contact portion. Accordingly, this configuration makes it possible to realize smooth movement of the pushed face and the contact portion, and to reduce friction therebetween.

It is preferable that the rattling restriction mechanism includes a stopper configured to restrict, to a fixed range, a range in which the contact member is movable while being pushed by the pushed face.

According to this configuration, the stopper can restrict excessive movement of the contact member. Further, the rattling restriction mechanism having this kind of stopper makes it possible to easily downsize and simplify the apparatus compared with the case of providing a stopper separately from the rattling restriction mechanism.

Industrial Applicability

The technique pertaining to the present disclosure can be used for a transport apparatus that transports articles.

What is claimed is:

1. A transport apparatus that transports an article, the apparatus comprising:
a holder configured to hold the article;
a transfer machine configured to move the article in a transfer direction and transfer the article between the holder and a transfer target location;
a support body supporting the holder and the transfer machine; and
a turning device configured to change the transfer direction by turning the holder and the transfer machine relative to the support body about a turning axis orthogonal to the transfer direction,
the turning device comprising:
a turner configured to turn relative to the support body about the turning axis, the turner supporting the holder and the transfer machine;
a turner drive source configured to drive the turner to turn;
a transmission mechanism configured to transmit a turning driving force from the turner drive source to the turner; and
a rattling restriction mechanism configured to restrict rattling in a turning direction of the turner caused by a backlash in the transmission mechanism,
the rattling restriction mechanism comprising:
a pushed portion configured to rotate in conjunction with turning of the turner; and
a restriction section supported by the support body,
the pushed portion comprising a pushed face facing the turning direction, and
the restriction section comprising:
a contact member configured to come into contact with the pushed face while the pushed face is positioned in a specific range in the turning direction, the contact member is arranged in a movement path of the pushed face configured to move in conjunction with the turning of the turner; and
a biasing mechanism configured to bias the contact member that is in contact with the pushed face, toward the pushed face in the turning direction.

2. The transport apparatus according to claim 1, wherein the pushed portion is fixed to the turner, and wherein the pushed face is a flat face extending in a radial direction of the turning axis and in a direction parallel to the turning axis.

3. The transport apparatus according to claim 1, wherein:
the pushed portion further comprises a second pushed face in addition to a first pushed face serving as the pushed face,
the first pushed face is a face facing a first side in the turning direction that is one side in the turning direction,
the second pushed face is a face facing a second side in the turning direction at a different position in the turning direction from the first pushed face, the second side in the turning direction is another side in the turning direction,
the contact member is configured to come into contact with the first pushed face from the first side in the turning direction while the first pushed face is positioned in a first specific range serving as the specific range, and come into contact with the second pushed face from the second side in the turning direction while the second pushed face is positioned in a second specific range in the turning direction, and
the biasing mechanism is configured to bias the contact member toward the second side in the turning direction while the contact member is in contact with the first pushed face from the first side in the turning direction, and bias the contact member toward the first side in the turning direction while the contact member is in contact with the second pushed face from the second side in the turning direction.

4. The transport apparatus according to claim 1,
wherein the contact member comprises a contact portion that is a portion configured to come into contact with the pushed face, and a pivotable body supporting the contact portion and pivotable about a pivot axis,
wherein the pivot axis is parallel to the turning axis and spaced apart from the turning axis, and
wherein the biasing mechanism comprises a spring member configured to bias the pivotable body toward a reference position in a pivot direction.

5. The transport apparatus according to claim 4,
wherein the contact portion is a roller supported rotatably about a rotation axis relative to the pivotable body, and
wherein the rotation axis is parallel to the pivot axis and spaced apart from the pivot axis.

6. The transport apparatus according to claim 1,
wherein the rattling restriction mechanism comprises a stopper configured to restrict, to a fixed range, a range in which the contact member is movable while being pushed by the pushed face.

\* \* \* \* \*

UNITED STATES PATENT AND TRADEMARK OFFICE
CERTIFICATE OF CORRECTION

PATENT NO. : 12,344,475 B2
APPLICATION NO. : 17/834526
DATED : July 1, 2025
INVENTOR(S) : Masashige Iwata Page 1 of 1

It is certified that error appears in the above-identified patent and that said Letters Patent is hereby corrected as shown below:

On the Title Page

Column 1, Prior Publication Data, Line 2, below "Dec. 8, 2022" insert:
-- Foreign Application Priority Data
Jun. 8, 2021 (JP) 2021-095960 --

Signed and Sealed this
Twenty-sixth Day of August, 2025

Coke Morgan Stewart
*Acting Director of the United States Patent and Trademark Office*